United States Patent
Bosch et al.

(10) Patent No.: US 11,509,591 B2
(45) Date of Patent: Nov. 22, 2022

(54) SYSTEM AND METHOD FOR HOSTING MOBILE PACKET CORE AND VALUE-ADDED SERVICES USING A SOFTWARE DEFINED NETWORK AND SERVICE CHAINS

(71) Applicant: Cisco Technology, Inc., San Jose, CA (US)

(72) Inventors: Hendrikus G. P. Bosch, Aalsmeer (NL); Jeffrey Napper, Delft (NL); Alessandro Duminuco, Milan (IT); Humberto J. La Roche, Ocean, NJ (US); Sape Jurriën Mullender, Amsterdam (NL); Surendra M. Kumar, San Ramon, CA (US); Louis Gwyn Samuel, Swindon (GB); Bart A. Brinckman, Nevele (BE); Aeneas Sean Dodd-Noble, Andover, MA (US); Luca Martini, Lakewood, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/334,335

(22) Filed: May 28, 2021

(65) Prior Publication Data
US 2021/0399991 A1 Dec. 23, 2021

Related U.S. Application Data

(63) Continuation of application No. 15/171,892, filed on Jun. 2, 2016, now Pat. No. 11,044,203.
(Continued)

(51) Int. Cl.
*H04L 12/825* (2013.01)
*H04L 12/801* (2013.01)
(Continued)

(52) U.S. Cl.
CPC .............. *H04L 47/25* (2013.01); *H04L 45/64* (2013.01); *H04L 47/29* (2013.01); *H04L 41/0896* (2013.01)

(58) Field of Classification Search
CPC ......... H04L 47/25; H04L 45/64; H04L 47/29; H04L 41/0896
See application file for complete search history.

(56) References Cited

U.S. PATENT DOCUMENTS

| 2016/0065456 A1* | 3/2016 | Muley | H04M 15/65 370/392 |
| 2016/0119253 A1* | 4/2016 | Kang | H04L 69/22 370/248 |

(Continued)

*Primary Examiner* — Huy D Vu
*Assistant Examiner* — Bailor C Hsu
(74) *Attorney, Agent, or Firm* — Patterson + Sheridan, LLP

(57) ABSTRACT

An example method is provided in one example embodiment and may include receiving traffic associated with at least one of a mobile network and a Gi-Local Area Network (data-plane), wherein the traffic comprises one or more packets; determining a classification of the traffic to a service chain, wherein the service chain comprises one or more service functions associated at least one of one or more mobile network services and one or more data-plane services; routing the traffic through the service chain; and routing the traffic to a network using one of a plurality of egress interfaces, wherein each egress interface of the plurality of egress interfaces is associated with at least one of the one or more mobile network services and the one or more data-plane services.

22 Claims, 17 Drawing Sheets

Related U.S. Application Data

(60) Provisional application No. 62/280,335, filed on Jan. 19, 2016.

(51) Int. Cl.
*H04L 12/715* (2013.01)
*H04L 47/25* (2022.01)
*H04L 47/10* (2022.01)
*H04L 45/64* (2022.01)
*H04L 41/0896* (2022.01)

(56) References Cited

U.S. PATENT DOCUMENTS

| | | | |
|---|---|---|---|
| 2017/0093658 A1* | 3/2017 | Ryan | H04L 67/02 |
| 2017/0214627 A1* | 7/2017 | Zhang | H04L 67/1023 |
| 2017/0332421 A1* | 11/2017 | Sternberg | H04W 76/11 |
| 2018/0091410 A1* | 3/2018 | Browne | H04L 41/5009 |

* cited by examiner

350

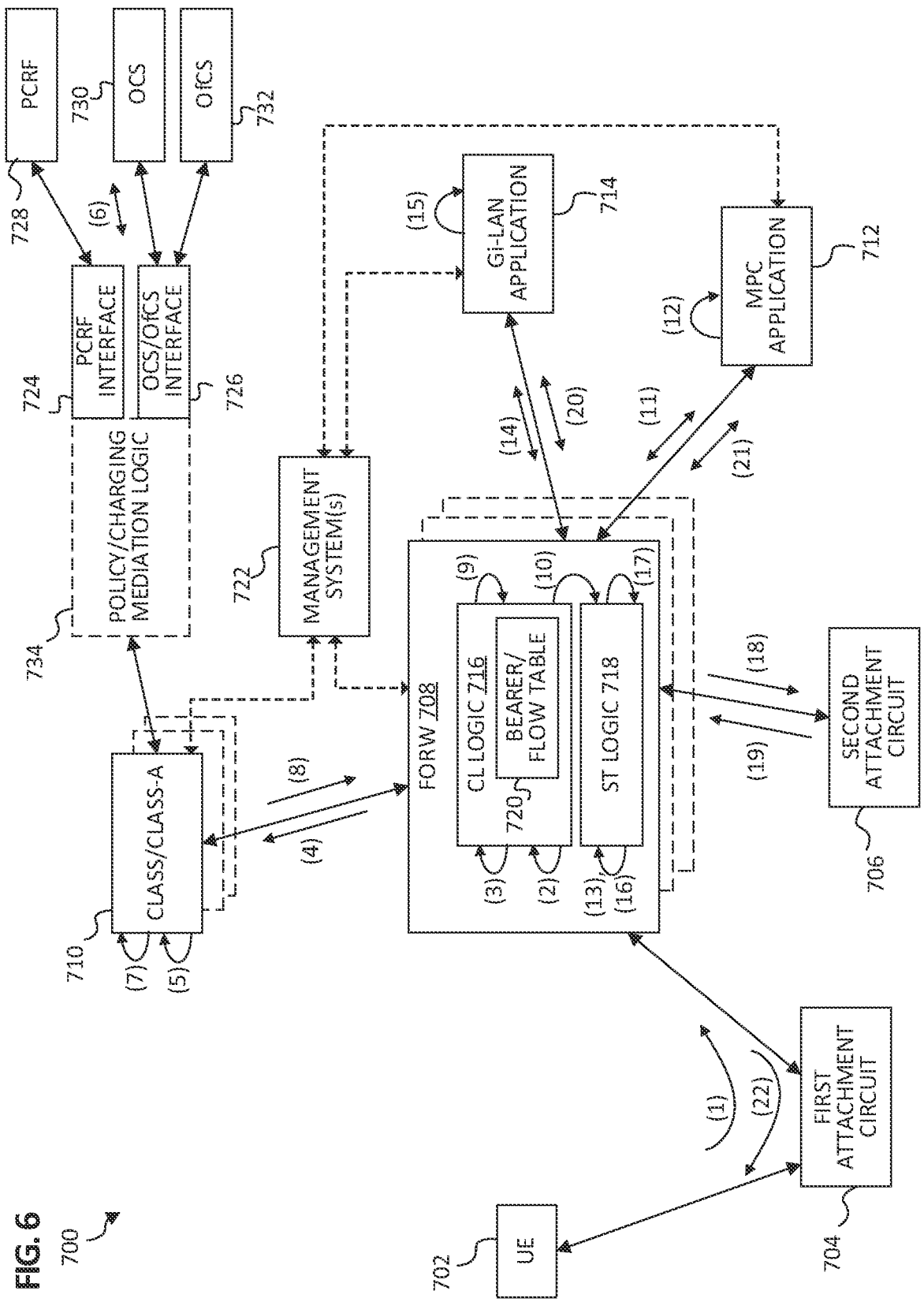

FIG. 8A

NSH LABEL 900

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        BASE HEADER 910                        |
+-+-+-+-+-+-+-+-+-+-+-+-+-+-+-+-+-+-+-+-+-+-+-+-+-+-+-+-+-+-+-+-+
|                     SERVICE PATH HEADER 920                   |
+-+-+-+-+-+-+-+-+-+-+-+-+-+-+-+-+-+-+-+-+-+-+-+-+-+-+-+-+-+-+-+-+
|                       CONTEXT HEADER(S) 930                   |
~                                                               ~
+-+-+-+-+-+-+-+-+-+-+-+-+-+-+-+-+-+-+-+-+-+-+-+-+-+-+-+-+-+-+-+-+
```

FIG. 8B

BASE HEADER 910

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|VER|O|C|R|R|R|R|R|R|   LENGTH  |   MD TYPE   | NEXT PROTOCOL   |
+-+-+-+-+-+-+-+-+-+-+-+-+-+-+-+-+-+-+-+-+-+-+-+-+-+-+-+-+-+-+-+-+
 911 912  913    914              915              916       917
```

FIG. 8C

SERVICE PATH HEADER 920

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               SERVICE PATH ID                 | SERVICE INDEX |
+-+-+-+-+-+-+-+-+-+-+-+-+-+-+-+-+-+-+-+-+-+-+-+-+-+-+-+-+-+-+-+-+
                        921                            922
```

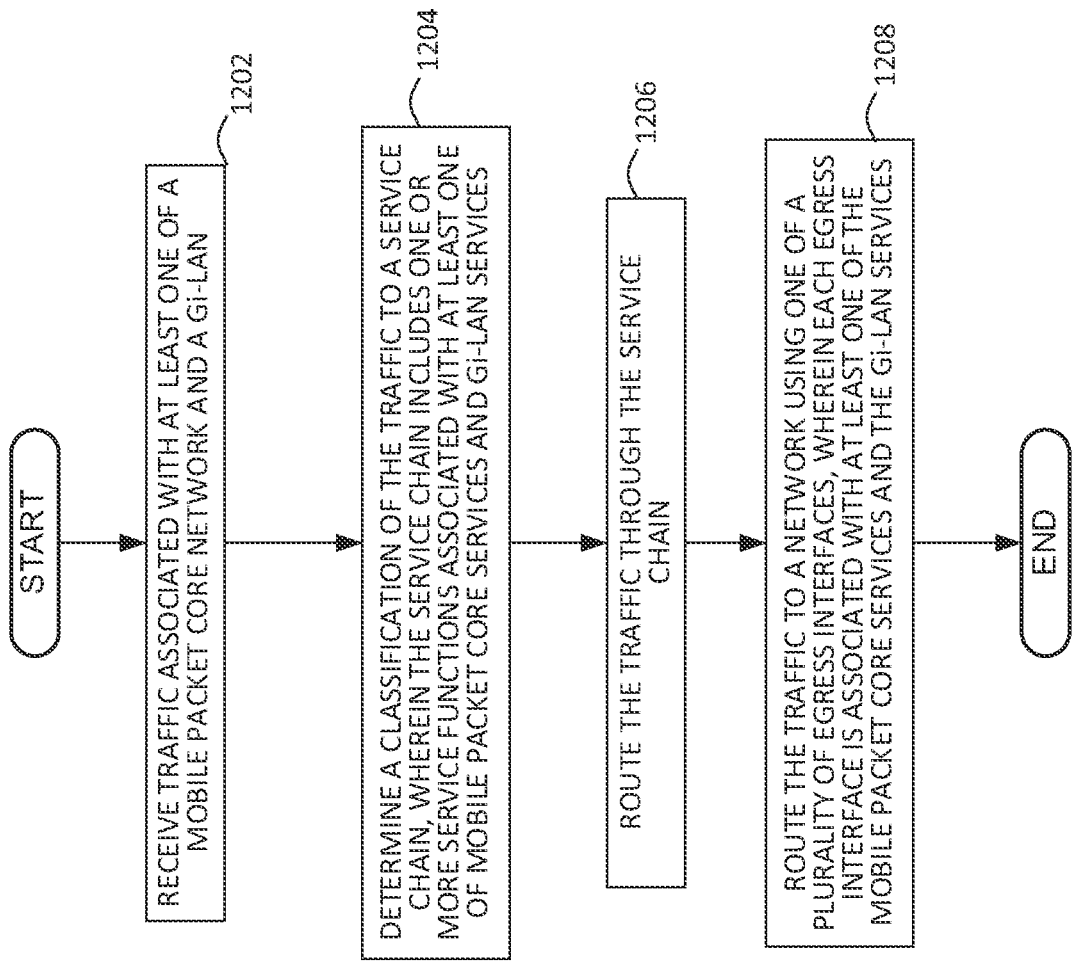

SYSTEM AND METHOD FOR HOSTING MOBILE PACKET CORE AND VALUE-ADDED SERVICES USING A SOFTWARE DEFINED NETWORK AND SERVICE CHAINS

CROSS-REFERENCE TO RELATED APPLICATION

This application is a continuation of U.S. application Ser. No. 15/171,892 filed Jun. 2, 2016, entitled "System and Method for Hosting Mobile Packet Core and Value-Added Services Using a Software Defined Network and Service Chains", inventors Hendrikus G. P. Bosch, et al. which claims priority to U.S. Provisional Application Ser. No. 62/280,335 filed Jan. 19, 2016, entitled "Hosting a Mobile Packet Core and Gi-LAN Services on Software Defined Network/Service Chains," inventors Hendrikus G. P. Bosch, et al. which Applications are considered incorporated by reference in its entirety into the disclosure of this Application.

TECHNICAL FIELD

This disclosure relates in general to the field of communications and, more particularly, to a system and method for hosting mobile packet core and value-added services using a software defined network and service chains.

BACKGROUND

A mobile packet core network (sometimes referred to as 'core', 'mobile packet core' or an 'Evolved Packet Core') typically provides all control and data-plane signaling needed to manage cellular/mobile line termination functionality for cellular/mobile subscribers and, once such cellular/mobile subscribers are connected to the core, to route associated Internet Protocol (IP) traffic to/from enterprises and/or the Internet by way of the 3rd Generation Partnership Project (3GPP) (S)Gi interface. As subscriber traffic passes the mobile packet core network, the mobile packet core network provides subscriber policy enforcement and charging functionality. In some cases, a Gi-Local Area Network (Gi-LAN) service infrastructure can be deployed to provide value-added data-plane services to augment a (mobile) service provider's service delivery in addition to the services provided for through mobile packet core services. However, mobile packet core and Gi-LAN service architecture solutions provided in current deployments are typically static solutions that do not enable easy separation between base and auxiliary core services, do not integrate Gi-LAN services, do not allow per-bearer and/or per-flow service chain steering and are not easy to deploy with cloud- and/or data-center infrastructures. Accordingly, there are significant challenges in deploying mobile packet core and Gi-LAN service architecture solutions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified block diagram illustrating example details that can be associated with an example logical network topology in which label stacking can be implemented in accordance with one potential embodiment of the present disclosure;

FIGS. 8A-8C are simplified schematic diagrams illustrating example details that can be associated with an example Network Service Header label in accordance with various potential embodiments;

FIG. 11 is a simplified flow diagram illustrating example details that can be associated with example operations to facilitate hosting mobile packet core and value-added services using a software defined network and service chains in accordance with one potential embodiment.

DETAILED DESCRIPTION OF EXAMPLE EMBODIMENTS

Overview

Figure 1A:
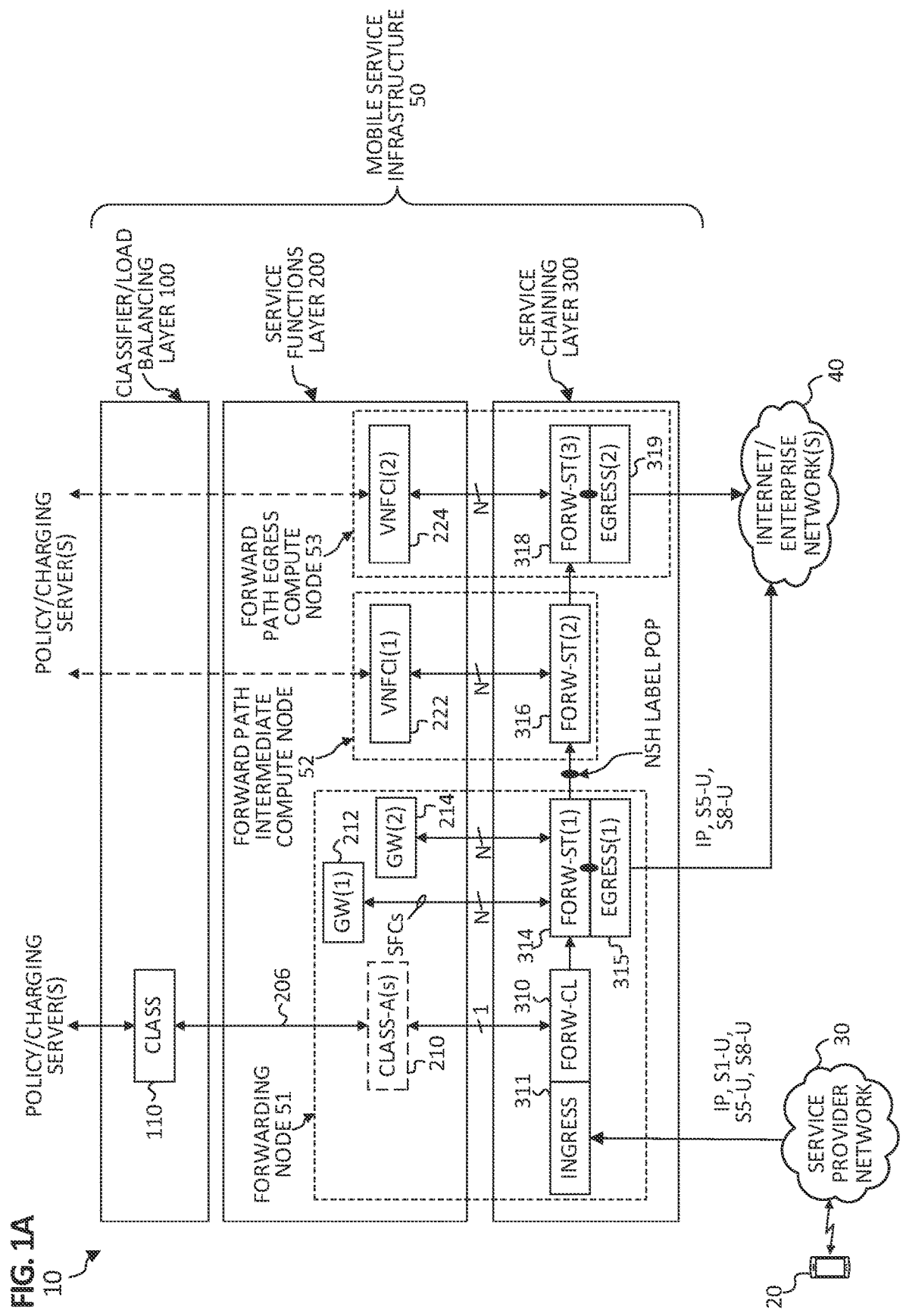
FIG. 1A is a simplified block diagram illustrating a communication system including a mobile service infrastructure to facilitate hosting mobile packet core and value-added services using a software defined network and service chains according to one embodiment of the present disclosure.

A method is provided in one example embodiment and may include receiving traffic associated with at least one of a mobile network and a Gi-Local Area Network (Gi-LAN), wherein the traffic comprises one or more packets; determining a classification of the traffic to a service chain, wherein the service chain comprises one or more service functions associated at least one of one or more mobile network services and one or more Gi-LAN services; routing the traffic through the service chain; and routing the traffic to a network using one of a plurality of egress interfaces, wherein each egress interface of the plurality of egress interfaces is associated with at least one of the one or more mobile network services and the one or more Gi-LAN services.

In some cases, the method can further include: configuring at least one mobile network fast-path comprising one or more service functions to perform only decapsulation and encapsulation operations on traffic; and configuring at least one mobile network slow-path comprising one or more service functions to perform decapsulation and encapsulation operations on traffic and to perform one or more operations associated with one or more mobile network services on traffic. In some instances, one or more service functions configured for a particular mobile network fast-path can perform at least one of: General Packet Radio Service (GPRS) Tunneling Protocol (GTP) decapsulation and encapsulation operations on the one or more packets.

In various instances, the classifying can be performed based on at least one of: policy information associated with a Policy and Charging Rules Function (PCRF); charging information associated with an Online Charging System (OCS); and charging information associated with an Offline Charging System (OfCS).

In some cases, routing the traffic can include multiplexing the traffic between the one or more mobile network services and the one or more Gi-LAN services and routing the traffic to the network from an egress interface associated with the one or more Gi-LAN services. In still some cases, routing the traffic can include multiplexing the traffic between the one or more mobile network services and the one or more Gi-LAN services and routing the traffic to the network from an egress interface associated with the one or more mobile network services. In some instances, the traffic can be associated with at least one of a bearer and a flow for a particular subscriber and the classification can be determined for at least one of the bearer and the flow for the particular subscriber.

In still some cases, the method can include storing data representing a network graph for a plurality of service chains, wherein each service chain is identified by a service path identifier. In some instances, a particular service function can be included within a plurality of the plurality of service chains.

In still some cases, the traffic can be received at a first forwarding function and wherein the determining can further include: determining whether a classification for the traffic is stored at the first forwarding function; routing packet for the traffic to a classification function when no classification for the traffic is stored at the first forwarding function; determining the classification for the traffic at the classification function; and returning the packet and the classification for the traffic to the first forwarding function. In still some cases, the method can include: constructing a service path identifier at the classification function based on the classification; and encapsulating the packet with the service path identifier to return to the first forwarding function.

In still some cases, the method can include: constructing service chain label stack, wherein the service chain label stack comprises one or more labels and wherein each label corresponds to one of a plurality of applications associated with a service path identifier, wherein each application comprises one or more service functions; and encapsulating the packet with the service chain label stack to return to the first forwarding function. In still some cases, the method can further include: storing the service chain label stack at the first forwarding function; and appending subsequent packets for the traffic with the service chain label stack. In still some cases, the method can include load balancing the traffic to one of a plurality of service chain paths, wherein each service chain path comprises one or more service functions to perform operations associated with the service chain to which the traffic is classified.

Example Embodiments

For purposes of understanding certain embodiments of systems and methods disclosed herein, it is important to appreciate the technologies and data that may be associated with network communications. The following foundational information may be viewed as a basis from which the present disclosure may be properly explained.

Typically, architectures that facilitate network communications generally rely upon three basic components: a data-plane, a control-plane, and a management-plane. The data-plane carries user traffic, while the control-plane and the management-plane serve the data-plane. As referred to herein in this Specification, the term 'plane' can refer to a separation of traffic that can traverse a network. As referred to herein in this Specification, the terms 'user-plane', 'data-plane' and 'user data-plane' can be used interchangeably.

Internally, a mobile packet core (MPC) in current deployments includes in its data-plane a series of base and auxiliary data-plane functions, or base and auxiliary services, that need to be applied one after the other such as, for example, line termination (i.e., removal and insertion of General Packet Radio Service (GPRS) Tunneling Protocol (GTP) headers), lawful interception, charging, roaming, idle mode and mobility, firewalling, network address and port translation (NA(P)T), IP address management, differentiated services code point (DSCP) marking, GTP user data-plane (GTP-U) messaging, policing and shaping, intrusion detection, gateway IP services and many other services to augment packet flows as these traverse between mobile devices and the Internet and/or external networks (e.g., enterprise networks).

As discussed herein in this Specification, a packet is a formatted unit of data that can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a user equipment (UE) and one or more elements or nodes of an Evolved Packet Core (EPC) or Evolved Packet System (EPS) for Long Term Evolution (LTE) architectures.

At a minimum, a default bearer, as defined in 3GPP standards, is established for a given UE upon initial attachment of the UE to a given Radio Access Network (RAN) node (e.g., an evolved NodeB (eNodeB), a NodeB, etc.). In some instances, one or more dedicated bearers can be established for a given UE for one or more specialized services or applications provided to the UE such as, for example, a Voice over LTE (VoLTE) session, a data session, a Voice over IP (VoIP) session, a gaming session, a video session, combinations thereof or the like. In general, a bearer for a given UE is associated with the following information and/or parameters within the EPC: 1) an Internet Protocol (IP) address for the UE, which can be allocated from a pool of IP addresses via Dynamic Host Configuration Protocol (DHCP), Stateless Address Auto-configuration (SLAAC}, etc.; 2} an IP address for an EPC node for a given PON connection for the UE; and 3) at least one GTP-U bearer tunnel extending between a PDN Gateway (PGW) and a Serving Gateway (SGW) and at least one GTP-U bearer tunnel extending from the SGW to the RAN node to which the UE is connected (e.g., if the UE is in a CONNECTED mode or state). In LTE architectures, a bearer can be identified using an EPS Bearer Identity (EBI).

A 'flow', 'Service Data Flow' (SDF) or 'service flow' as referred to herein in this Specification can refer to a GTP or IP flow or aggregation of GTP or IP flows for a cellular/mobile subscriber (e.g., to/from a UE associated with a cellular/mobile subscriber) for which a particular Quality of Service (QoS) level is applied to packets associated with the flow(s). QoS level is often indicated by a QoS Class Identifier (QCI). By aggregation of IP flows, it is meant that multiple IP flows can, in some cases, be mapped to a same service flow. In some cases, multiple flows can be aggregated to a given UE bearer (e.g., default and/or dedicated) for transport to/from a given UE. Service flows having a same QoS level or class are often mapped or steered to a same UE bearer. A QoS level or class is typically implemented by the bearer for an IP flow. Thus, both bearers and flows can be associated with QoS levels.

Most mobile packet core data-plane services provided in current deployments are embedded into a single monolithic mobile packet core solution such that each of the embedded base and auxiliary services are often difficult to selectively enable and/or disable for specific subscriber bearers and/or flows. Moreover, the deployment model of current mobile packet cores is either a purpose-built network element, or a virtualized appliance of such a purpose-built network element.

One goal of current Gi-LAN service infrastructures is to provide value-added data-plane services to augment the (mobile) service provider's service delivery in addition to the services provided through mobile packet core services. Gi-LAN services can include, but not be limited to, protection of Radio Access Networks (RANs) and other system or subscriber assets (e.g., protection against denial-of-service attacks), protocol- or application-level service delivery (e.g., mobile/cellular Transmission Control Protocol (TCP) optimizations, video optimization, etc.), policing of incoming or outgoing flows (e.g., firewalling, rate control) and/or providing for additional application-specific charging functionality (e.g., based on Hypertext Transfer Protocol (HTTP)/Secure (HTTP/S level functions), etc.

Each of the Gi-LAN data-plane services in a Gi-LAN architecture can be treated as independent service functions and these service functions may be functionally no different from auxiliary services provided in a mobile packet core. Yet, from a deployment perspective, each of Gi-LAN services in traditional Gi-LAN architectures are either network elements themselves or virtualized appliances of such network elements. These traditional Gi-LAN services are deployed on the 3GPP Gi or SGi interface between a mobile packet core and an enterprise network and/or the Internet. The 3GPP Gi interface and the 3GPP SGi interface can be collectively referred to herein using the term '(S)Gi interface'. Gi-LAN data-plane services are generally considered to be middle box functions, but may also support termination services.

Generally, a service chain is defined as a mechanism by which packets, as part of a packet flow, are steered through an ordered set of services such that egress from one service function corresponds to ingress of a next service function. A service-chain-number and a service-index number are typically used to identify a service chain. Both numbers can be used to identify service-functions hosted on a given service chain. Also, typically a service chain controller as part of a Software Defined Network (SDN) controller manages the service chains.

Several forms of service chaining exist in current deployments including, but not limited to, cloud-infrastructure provided service chaining, data-center provided service chaining and/or hardware-based service chaining technologies for cloud-/data-center and/or more traditional infrastructures. Modern service chaining and SDN solutions can include complete model-driven service chaining and service function deployments to enable malleable service composition with virtualized and/or physical services. As referred to herein in this Specification, the terms 'service chain' 'service function chain' (SFC) and can be used interchangeably.

Cloud- and/or data-center solutions may provide a service chaining and SDN solution (e.g., by way of emerging OpenStack solutions). Standards Development Organizations (SDOs) such as the European Telecommunications Standards Institute (ETSI) Network Function Virtualization (NFV) Industry Specification Group are standardizing orchestration and management procedures for service composition with cloud- and data-center infrastructures.

As referred to herein in this Specification, the terms 'virtualized network function' and 'virtual machine' can encompass an emulation of a computer system and/or computing platform operating based on the computer architecture and functions of a real or hypothetical computer, with particular embodiments involving specialized hardware, software, or a combination of both. In various embodiments, a virtual network function (VNF), a virtual machine (VM), a virtual network function component (VNFC), a VNFC instance (VNFCI), a virtualized deployment unit (VDU), virtualized functionality and/or any virtualized network controller (e.g., a virtual network function manager (VNFM)), gateway, module, aggregator, combinations thereof or the like as described herein can be instantiated for operation via a hypervisor-based virtualization or a container-based virtualization of a server (e.g., blade server, rack server, stand-alone server) using the server's hardware (e.g., processor(s), memory element(s), etc.) and/or operating system for a given SDN/VNF architecture. As referred to herein in this Specification, virtualized services can include services deployed as containers, virtual machines and/or operating system processes.

In some cases, mobile packet core solutions may use internal service chains; yet, these mobile packet core service chains do not enable easy, model-driven customization. As noted, such mobile packet core service chaining solutions oftentimes are static solutions, do not enable easy separation between base and auxiliary core services, do not integrate Gi-LAN services, do not allow per bearer and/or per flow service chain steering and are not easy to deploy with cloud- and/or data-center infrastructures.

Figure 1B:
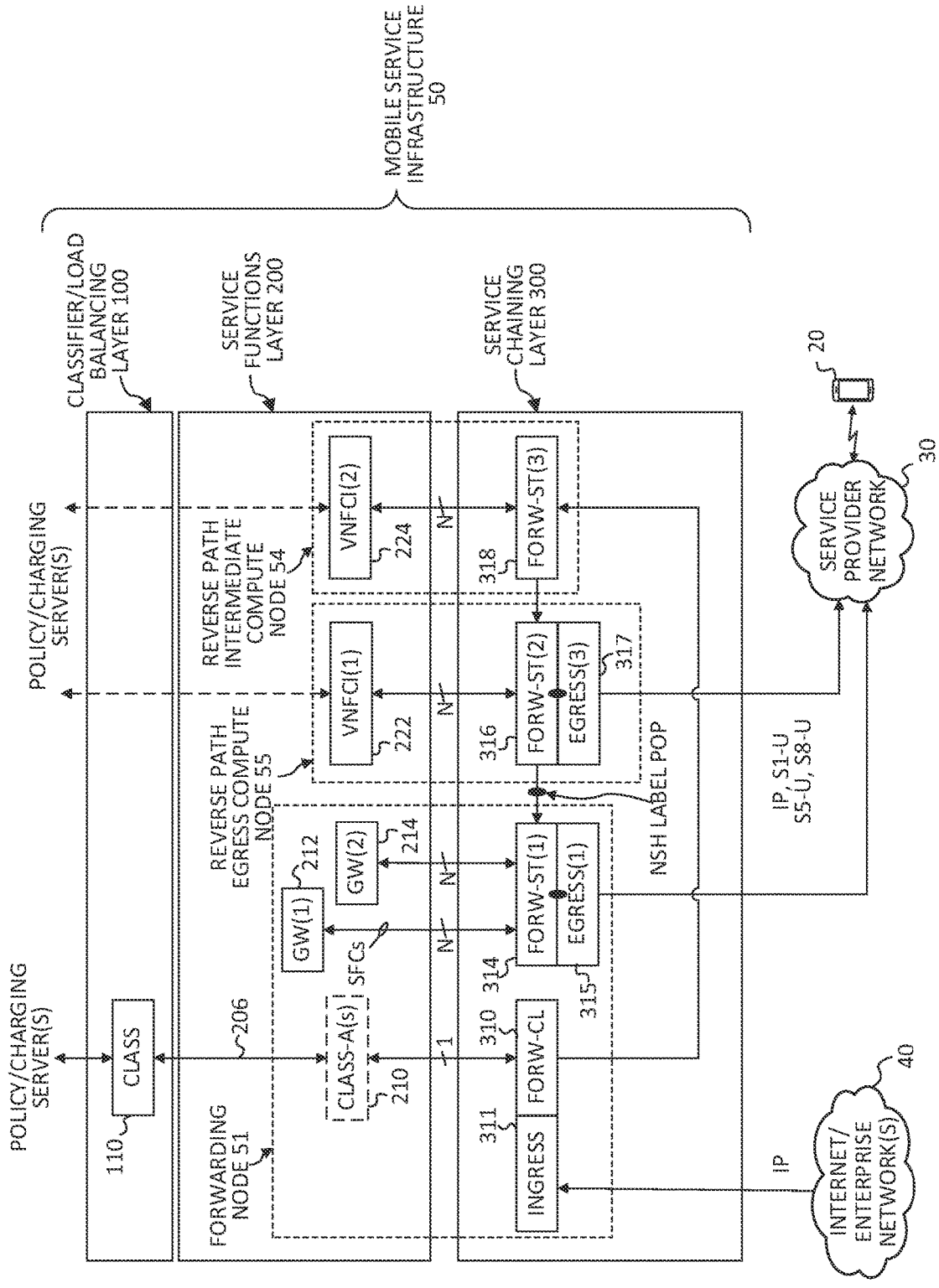
FIG. 1B is a simplified block diagram illustrating example details that can be associated with the mobile service infrastructure in accordance with one potential embodiment.

In accordance with at least one embodiment, these shortcomings (and others) can be overcome by a communication system 10, as shown in FIGS. 1A-1B, which can provide a system and methods for hosting mobile packet core base and/or auxiliary physical and/or virtualized services and/or Gi-LAN physical and/or virtual services within a cloud-infrastructure and/or data-center environment or other resident service-chaining solution using an SDN service chaining solution. Communication system 10 can include a mobile service infrastructure 50, which can facilitate implementation of mobile packet core services and/or Gi-LAN service infrastructure services.

In accordance with one embodiment, communication system 10 via mobile service infrastructure 50 can provide a system and associated methods that can be used to decompose the current monolithic mobile packet core data-plane into base and auxiliary service components and host these service components independently using an SDN service chaining solution. In one embodiment, the mobile service infrastructure 50 can be extended to augment a decomposed mobile packet core with services typically hosted on a Gi-LAN infrastructure within the same common framework. Each of the services can be of a physical and/or virtual appliance nature. In the latter, by embedding such service components in a cloud infrastructure, or simply with data-center resources, it is possible to dynamically scale mobile packet core data-plane functions and Gi-LAN services based on demand, appliance failures, connection failures or the like.

In one embodiment, a method is provided in which mobile packet core traffic associated with a mobile packet core network and Gi-LAN services traffic is managed. During operation, arriving packets are first classified and load balanced, e.g., a service chain and service path is selected, before packets are routed and/or steered through a given service chain and its associated mobile packet core base and/or auxiliary service functions, which can be combined with Gi-LAN hosted service functions. To use standards-based terminology, mobile service infrastructure 50 can, in various embodiments, provide for the ability to host a decomposed Policy Charging and Enforcement Function (PCEF) [e.g., to enforce policies received from a policy server(s) for classifying traffic toward mobile packet core service functions], a Traffic Detection Function (TDF) [e.g., to enforce policies received from a policy server(s) for classifying traffic toward (S)Gi-LAN service functions] and/or a Traffic Steering Support Function (TSSF) [e.g., as defined in 3GPP Technical Specification (TS) 23.203 to enforce policies received from a policy server(s) for classifying traffic toward service functions] using an SDN service chaining solution.

In one embodiment, communication system 10 via mobile service infrastructure 50 can provide for managing services by way of model-driven deployments and enabling selective subscriber and/or flow-based service steering through a set of services; thus, providing for a complete, yet tailor-made, mobile packet core and Gi-LAN service infrastructure. Such a model-driven and per-subscriber and/or per-flow customization of mobile service delivery through the mobile core solution is important to enable new mobile business models for 3GPP 5G networks, (cellular) Internet of Things (IoT) networks, network slicing, split control/user-plane network solutions, combinations thereof and the like. Thus, the mobile service infrastructure 50 can provide for malleable, optimized, and scalable mobile service (data-plane) delivery for a wide-range of mobile use cases.

Referring to FIG. 1A, FIG. 1A is simplified block diagram illustrating communication system 10, which can include physical and/or virtualized resources that may be deployed in cloud-computing and/or data-center environments to perform mobile packet core and/or Gi-LAN data-plane operations in accordance with one potential embodiment. As shown in FIG. 1A, communication system 10 can include users operating UE 20, a service provider network 30, an Internet and/or Enterprise network(s) 40 and mobile service infrastructure 50.

FIG. 1A illustrates example details that can be associated a particular example use case in which mobile service infrastructure 50 facilitates forward path processing for forward path user data-plane traffic received from UE 20 via service provider network 30. The user data-plane traffic can be steered to Internet and/or enterprise networks 40. FIG. 1B illustrates other example details associated another example use case in which mobile service infrastructure 50 provides reverse path processing for reverse path traffic sent from the Internet and/or enterprise networks 40 to the UE 20 via service provider network 30. It should be understood that there are typically many millions of subscribers whose traffic can be handled by the mobile service infrastructure. Only one subscriber associated with UE 20 is shown as an example for FIGS. 1A-1B for illustrative purposes only and is not meant to limit the broad scope of the present disclosure. Any number of UE can be present in communication system 10 in accordance with various embodiments described herein. FIGS. 1A and 1B will be discussed with reference to each other herein.

Mobile service infrastructure 50 can include three logical layers: a classifier and/or load balancing layer 100, a service functions layer 200 and a service chaining layer 300. Classifying and/or load balancing functionality can be referred to collectively using the term 'classifier/load balancer' and variations thereof. Classifier/load balancing layer 100 can include a classification function (CLASS) 110. Service functions layer 200 can include one or more gateway (GW) functions such as, for example a first GW(1) 212 and a second GW(2) 214. Service functions layer 200 can further include one or more value-added services (e.g., Gi-LAN services and/or mobile packet core auxiliary services) such as for example a first VNFC, which can be instantiated as a first VNFCI(1) 222, and a second VNFC, which can be instantiated as a second VNFCI(2) 222. In at least one embodiment, service functions layer 200 can include one or more classification agent(s) (CLASS-A(s)) 210, which may be a logical extension of CLASS 110 that can aid in service chain programming. Service chaining layer 300 can include one or more ingress interface 311 and one or more forwarding functions, which can be provided in two forms as discussed in further detail below, and one or more egress interfaces such as, for example, a first egress(1) interface 315 and a second egress(2) interface 319. As referred to herein in this Specification, a forwarding function can also be referred to generally as a forwarder.

A first form of a forwarding function as can be provided by mobile service infrastructure 50 can include a classifier (FORW-CL) 310, which in combination with CLASS 110 and/or optional CLASS-A(s) 210, can be configured to associate, based on classification operations, service chain labels to bearers and/or flows for ingress traffic received via ingress interface 311, and a second form can include one or more steering functions (FORW-ST) such as, for example, a first FORW-ST(1) 314, a second FORW-ST(2) 316 and a third FORW-ST(3) 318, each of which can be configured to route traffic over one or more service chains. In at least one embodiment, ingress interface 311 can be configured to provide ingress Virtual Routing Forwarding (VRF) abstraction and interfacing for incoming traffic to enable FORW-CL 310 to interface with CLASS 110 and/or CLASS-A 210, if configured. In another embodiment, an ingress interface may be an attachment circuit, for example, as defined in IETF Request For Comments (RFC) 4364 pointing to a VRF.

Any flow steering functions can be configured to provide egress processing via a corresponding egress interface, which can be configured to: 1) only steer forward path traffic from mobile service infrastructure 50 towards the Internet and/or enterprise network(s) 40; 2) only steer reverse path traffic from the Internet and/or enterprise network(s) 40 towards an access attachment circuit such as service provider network 30 and/or a RAN for delivery to a subscriber; or 3) to provide forward path and reverse path egress processing in accordance with various embodiments. For example, first egress(1) interface 315 for first FORW-ST(1) 314, which can represent a flow steering function for one or more mobile packet core services in at least one embodiment can provide egress processing for both forward and reverse path traffic. In various embodiments, egress processing can include selecting an appropriate egress attachment circuit (e.g., vLAN, tunnel, etc.).

The CLASS 110 can interface with one or more policy and/or charging server(s) (e.g., one or more Policy and Charging Rules Functions (PCRFs), one or more Online Charging System (OCSs), one or more Offline Charging Systems (OfCSs), etc.) and can operate to push policy information and/or charging information to the service chaining layer 300. In some embodiments in which at least one CLASS-A 210 is configured for service functions layer 200, CLASS 110 can interface with the at least one CLASS-A 210 via a control interface 206. The at least one CLASS-A 210 can further interface with FORW-CL 310 in the service chaining layer 300.

In various embodiments, control interface 206 can be an interface which complies with one or more control and configuration protocols including, but not limited to, OpenFlow™, GTP control-plane (GTP-C) and/or the Netconf/Yang (NC/Y) standard. Otherwise, in embodiments in which no CLASS-A(s) 210 are configured in the service functions layer 200, then CLASS 110 can interface with FORW-CL 310. The FORW-CL 310 can communicate with the optional CLASS-A(s) 210 and/or CLASS 110 using a communication channel, which can be based on Internet Engineering Task Force (IETF) Service Function Chain (SFC) Network Service Header (NSH) service chaining communication standards and/or protocols. In various embodiments, any of a CLASS 110, a CLASS-A 210 and/or a forwarding function can be instantiated as VNFCI.

FORW-CL 310 can be in communication with one or more flow steering functions and can forward classified packets for bearers and/or flows into corresponding service function chains (SFCs). As shown in the embodiment of FIG. 1A, FORW-CL 310 is in communication with first FORW-ST(1) 314, which is in communication with GW(1) 212 and GW(2) 214. FORW-ST(1) 314 can interface with GW(1) 212 and GW(2) 214 via 'N' communication channel(s) depending on the number of service functions, gateways or the like, virtual or physical, instantiated or deployed for mobile service infrastructure 50. In one embodiment, the communication channels can be based on IETF SFC NSH service chaining communication standards and/or protocols. It should be understood that FORW-CL 310 can be in communication with any of FORW-ST(1)-FORW-ST(3) or any other flow steering function that may be configured/instantiated in mobile service infrastructure 50 in order to forward packets into various SFCs.

For the embodiment shown in FIG. 1A, first FORW-ST(1) can also configured with first forward path egress(1) interface 315, which can provide for interfacing with Internet/enterprise network(s) 40. First FORW-ST(1) 314 can further be in communication with second FORW-ST(2) 316, which can be in communication with first VNFCI(1) 222. For the embodiment shown in FIG. 1A, it is assumed that second FORW-ST(2) is not configured with a forward path egress interface but rather is configured to communicate with third FORW-ST(2) 316. Third FORW-ST(3) 318 is in communication with second VNFCI(2) and is further configured with second forward path egress(2) interface 319, which can provide for interfacing with Internet/enterprise network(s) 40. FORW-ST(2) 316 can communicate with VNFCI(1) 222 via 'N' communication channel(s), which can be based on IETF SFC NSH service chaining communication standards and/or protocols. FORW-ST(3) 318 can communicate with VNFCI(2) 224 via 'N' communication channels, which can also be based on IETF SFC NSH service chaining communication standards and/or protocols. Although VNFCIs are illustrated in the embodiment of mobile service infrastructure 50 shown in FIG. 1A-1B, Physical Network Functions (PNFs) can also be deployed in mobile service infrastructure 50 in various embodiments. VNFCIs and/or PNFs can be supported through virtual machines, containers and/or other virtualized deployment configurations. In various embodiments, VNFCIs (e.g., one or both of VNFCI(1), VNFCI(2)) can interface with one or more policy and/or charging server(s).

Generally during operation, the classifier/load balancing layer 100 can enforce policies and/or charging for policy and/or charging information obtained from one or more policy and/or charging server(s) and can bridge or 'translate' those polices to the service chaining layer 300. The service functions layer 200 can provide service functions associated with mobile packet core data-plane and/or Gi-LAN services and the service chaining layer 300 can implement service chains (e.g., when combined with services from the service layer 200). In various embodiments, as discussed herein, service functions can be virtual or virtualized service functions (e.g., software running in a data center) and/or separate physical nodes (e.g., hardware) performing service function operations; thus, use of the terms 'virtual' or 'virtualized' in describing various elements, nodes, devices, etc. shown in the FIGURES described herein is not meant to be limit the broad scope of the present disclosure.

In one embodiment, the combined mobile packet core and/or Gi-LAN services either configured as a PCEF, a TDF and/or a TSSF hosted on one or more service chains provided by mobile service infrastructure 50 can be modeled as a mobile service Directed Acyclic Graph (DAG). An example DAG that can be configured in accordance with one potential embodiment of mobile service infrastructure 50 is discussed in further detail below with reference to FIG. 2.

FORW-CL 310 configured with ingress interface 311, FORW-ST(1) 314 configured with forward path egress(1) interface 315, GW(1) 212, GW(2) 214 and CLASS-A 210, if deployed, can represent a forwarding node 51 of a mobile service DAG. In some embodiments, if hosted on a same server or machine, CLASS 110 can be considered as part of forwarding node 51. For the embodiment shown in FIG. 1A, FORW-ST(2) 316, having no configuration for a forward path egress interface and VNFCI(1) 222 can represent an forward path intermediate compute node 52 of the mobile service DAG. For the embodiment shown in FIG. 1A, FORW-ST(3) 318 configured with forward path egress(2) interface 319 and VNFCI(2) 224 can represent a forward path egress compute node 53 of the mobile service DAG. Thus, the forwarding node 51, forward path intermediate compute node 52 and forward path egress compute node 53 can depict a potential layout of a mobile service DAG having the service chaining layer 300 implemented over compute and/or forwarding nodes for forward path processing. FORW-CL 310 configured with ingress interface 311 of forwarding node 51 can also handle processing for reverse path traffic, as discussed in further detail below with regard to FIG. 1B.

In various embodiments, packet-forwarding nodes can be special purpose forwarding nodes and/or standard compute nodes that can support different configurations and/or combinations of classifying, load balancing, forwarding, and/or computing functionality. Thus, although separate forwarding functions are illustrated for FORW-CL and FORW-ST (1)-(3), it should be understood that a forwarding node can be configured to provide both FORW-CL and FORW-ST functionality for one or more FORW-CL instances and/or one or more FORW-ST instances.

For embodiments in which at least one CLASS-A 210 is configured for mobile service infrastructure 50, CLASS-A 210 can serve as a policy and/or charging information cache co-located with the forwarding node 51 for performance reasons. In such embodiments, CLASS-A can inform FORW-CL 310 of an assigned service chain label stack for a bearer and/or flow. CLASS 110 can interface with a policy and/or charging server (e.g., a PCRF, OCS, OfCS) to obtain subscriber policy and/or charging state and can combines this with its knowledge of a given mobile service DAG; in other words, CLASS 110 can act as the main classifier/load balancing entity for mobile service infrastructure 50.

There are many possible methods to implement service chaining. In one embodiment, service chains within mobile service infrastructure 50 can be composed using IETF SFC NSH-based service chaining techniques to encode metadata and service path information and provide tunneling for service chains. It should be understood that IETF SFC NSH service chaining is only an example tunneling protocol that can be provided via mobile service infrastructure 50. Other tunneling protocols can be equally provided via mobile service infrastructure 50 in accordance with various embodiments. In various embodiments, steering of traffic across service chains can be provided using one or more 'labels', which can be included in a service header such as, for example, an IETF SFC NSH, or can carried elsewhere for one or more packets.

An IETF SFC NSH is a shim header that is interposed between an outer, overlay, header and an inner, subscriber data, header. An IETF SFC NSH, as discussed in further detail herein, is a structure that can include one or more SFC headers that can be used to steer packets through one or more service chain(s) or set(s) of service chain(s). An IETF SFC NSH can carry metadata and service path information to allow an overlay to efficiently enforce a specific sequence of functions (e.g., GW functions, service functions, etc.) desired for certain traffic. In one embodiment, an IETF SFC NSH header can be constructed for incoming traffic by a classifier CLASS (e.g., CLASS 110) or a CLASS-A (e.g., CLASS-A 210) for a given service chain as selected for the traffic that: (1) assigns the traffic to one or more particular service chain(s) according to a policy for the traffic, and (2) assigns the traffic to particular service chain path(s) (e.g., a particular instantiation of a service chain) according to a load-balancing decision. The constructed NSH can be communicated to a flow classifier (e.g., FORW-CL) 310 for use with subsequent packets for the traffic. As referred to herein, an IETF SFC NSH can be referred to more generally as a label or an NSH label.

In some embodiments, a service chain and service chain path can be identified using a two-tuple identifier such that the first value in the two-tuple represents the service chain for a service chain classification for a bearer and/or flow and the second value in the two-tuple is a service path identifier (SPI) that identifies the selected service chain path selected for the bearer and/or flow. The two-tuple can be carried in a NSH label along with other metadata and/or path information.

In accordance with one embodiment, communication system 10 via mobile service infrastructure 50 can provide for stacking multiple (possibly modified) NSH headers to implement a composition of one or more service chain(s) or set(s) of service chain(s) that can be provided by mobile service infrastructure 50. NSH headers can be stacked to construct a service chain label stack in order to steer traffic (e.g., packets) for a bearer and/or flow across one or more service chain(s) or set(s) of service chain(s) based on a classification of the traffic. Each service in a service chain can be numbered. In one embodiment, for example, a first NSH header can be used to steer packets for a given bearer and/or flow across a one or more services of a mobile packet core service chain and a second NSH header can be used to steer the packets for the given bearer and/or flow across one or more services of Gi-LAN service infrastructure service chain. Other label stacking features and embodiments are discussed in further detail below.

Returning to FIGS. 1A-1B, in one embodiment, once CLASS 110 can make a classification and/or load balancing decision for a subscriber's traffic and, if multiple CLASS-As are deployed, CLASS 110 can inform all CLASS-As in the system of that classification and load balancing decision. Such functionality may be advantageous, in particular for embodiments in which the solution provided by mobile service infrastructure 50 is combined with Equal Cost Multipath (ECMP) flow distribution from a data-center router. In such embodiments, regardless of how a bearer and/or flow is ECMP load-balanced for a subscriber, all CLASS-As can classify and load balance the subscriber bearer and/or flow identically without requiring communication with CLASS 110. FORW-CL 310 can efficiently map bearers and/or flows based earlier classifications of subscriber traffic. In cases in which a new bearer and/or flow enters the mobile service infrastructure, or when FORW-CL 310 has no knowledge of a specific bearer and/or flow for a given subscriber's traffic, FORW-CL 310 can interact with CLASS/CLASS-A (depending on configuration) to obtain a service chain label stack associated with the given subscriber's traffic. For embodiments in which CLASS-As are not deployed, FORW-CL 310 interacts directly with CLASS 110. In various embodiments, mobile service infrastructure 50 can be deployed with many CLASS-A/CLASS instances to handle varying classification loads and address ECMP load balancing. It can be assumed that hybrid models of FORW-CL(s) configured with and without CLASS-As or a mixture thereof are supported as well.

In various embodiments, a GW can be configured to perform various functions and multiple instances of the same type of GW can exist within mobile service infrastructure 50. In at least one embodiment, a GW say, for example, GW(1) 212 can be configured as a traditional mobile core packet gateway such as, for example, a serving gateway (SGW), a packet data network (PDN) gateway (PGW), a System Architecture Evolution (SAE) gateway, a Serving GPRS Support Node (SGSN), and/or a Gateway GPRS Support Node (GGSN). In various embodiments, more traditional 3GPP mobile core packet gateway functionality can include deep packet inspection (DPI), lawful intercept, charging creation, IP address management, line termination, firewalling, NA(P)T, DSCP marking, combinations thereof or the like as described herein.

An SGW is a data-plane element that can manage user mobility and interfaces with RAN nodes (e.g., eNodeBs, NodeBs, Home eNodeBs (HeNBs), Home NodeBs(HNBs)). The SGW also maintains data paths between RAN nodes and PGW(s). A PGW typically provides IP connectivity access network (IP-CAN) session connectivity for UEs to external packet data networks (PDNs) (e.g., Internet and/or enterprise network(s) 40). An SGSN may provide access for legacy Universal Mobile Telecommunication System (UMTS) network devices. For example, UE in a UTRAN or Global System for Mobile Communications (GSM) Enhanced Data Rates for GSM (EDGE) radio access network (GERAN) can communicate through an SGSN to an SGW or a PGW, which can include or be configured with functionality for a GGSN to support communication with legacy systems.

The performance of a mobile packet core is typically dictated by the volume and complexity of software needed to handle the traffic subjected to it. Since mobile service providers/operators sometimes do not need or want to apply intricate software mechanisms of a traditional mobile packet core to all flows on all bearers, a mechanism is needed to route traffic onto separate optimized data paths, referred to herein as 'fast-paths', which can provide limited mobile packet core (data-plane) functionality and 'slow-paths', which may provide more traditional mobile packet core (data-plane) functionality with the associated limited capacity.

In accordance with one embodiment, communication system 10 via mobile service infrastructure 50 can provide for the ability to selectively route mobile packet core bearer and/or flow traffic through a mix of specialized fast-path bearer functions and traditional, slow-path mobile packet core data-plane functions. In at least one embodiment, a GW, say, for example, GW(2) can be configured as a highly optimized fast-path (FP) processing for S- and P-GW functions. By fast-path processing, it is meant that, in at least one embodiment, GW(2) can be configured to provide functionality for GTP header encapsulation/decapsulation of data-plane packets. Although examples and embodiments discussed herein are applied to mobile packet core network operations, it should be understood that the examples and embodiments can be applied to any mobile network such as, for example, a 5G mobile networks, (cellular) Internet of Things (IoT) ((C)IoT) networks, network slicing, split control/user-plane network solutions, combinations thereof and the like within the scope of the teachings of the present disclosure.

In other embodiments, both GW(1) and GW(2) may be configured to implement SGW and PGW functionality in various other forms, which may be optimized for specific use cases and/or deployment models (e.g., to support network slicing, IoT, etc.). In still other embodiments, GWs provided in service functions layer 200 may be configured to provide line termination functions for other access technologies including, but not limited to, cable access Wi-Fi® wireless network access, combinations thereof or the like.

In various embodiments, a VNF and/or VNFC can be configured to perform various function associated with Gi-LAN services and/or auxiliary mobile packet core services including, but not limited to protection of Radio Access Networks (RANs) and other system or subscriber assets (e.g., protection against denial-of-service attacks), protocol- or application-level service delivery (e.g., mobile/cellular TCP optimizations, video optimization, etc.), policing of incoming or outgoing flows (e.g., firewalling, rate control) and/or providing for additional application-specific charging functionality (e.g., based on HTTP and/or HTTP/S level functions), combinations thereof or the like. Multiple instantiations of a VNF/VNFC can be instantiated in mobile service infrastructure 50 (e.g., VNFCI(1) 222, VNFCI(2) 232) depending on a number of service chains, load, equipment failures, etc. to support data-plane traffic flows across mobile service infrastructure.

During operation, CLASS 110, optional CLASS-A 210 and FORW-CL 310 can operate jointly to provide classification and/or load balancing functionality for mobile service infrastructure 50. Every incoming packet for a particular bearer and/or flow of a given subscriber is first assigned a service chain label stack by FORW-CL (e.g., once the bearer and/or flow has been classified and/or load balanced) and then steered through a specific service chain path(s) based on one or more service chain label(s) contained in the service chain label stack. In general, an attachment circuit identifier together with an IP header mask and/or a GTP-U tunnel endpoint identifier (TEID) can be used to uniquely identify a subscriber's bearer and/or flow. FORW-CL via CLASS 110/optional CLASS-A 210 can use this information to associate a service chain label stack to a subscriber's bearer and/or flow. In some embodiments, a default service-chain can be configured for bearers and/or flows for which FORW-CL cannot provide a service chain label stack. This default service chain leads to the optional at least one CLASS-A 210 or CLASS 110, in case at least one CLASS-A 210 is not deployed.

During operation in at least one embodiment for forward path processing, ingress traffic is received at ingress interface 311 of the forwarding node 51. Ingress traffic may include IP traffic, S1 user-plane (S1-U) traffic, S5-U traffic, S8-U, combinations thereof or the like. FORW-CL 310 classifies incoming traffic, e.g., flows and/or bearers, by performing a look-up on a particular flow and/or bearer via an internal bearer/flow table maintained by FORW-CL 310. More generally, a service chain including one or more service functions is selected to operate on the traffic.

In case a flow- and/or bearer-classification of the traffic is not available in FORW-CL 310, the traffic is first directed to CLASS-A 210 or CLASS 110 (depending on configuration) for classification purposes. CLASS-A/CLASS (depending on configuration) can determine an appropriate classification for the traffic to a particular service chain. In some embodiments, CLASS-A/CLASS can also perform load balancing across service chain instances to assign the traffic to a particular service chain path. CLASS-A/CLASS can construct the service chain label stack for the classified and/or load balanced traffic, can encapsulate the packet with the service chain label stack and can return the packet including the service chain label stack to the FORW-CL 310. In some embodiments, CLASS-A/CLASS can include with the packet a flag or other identifier indicating to the FORW-CL 310 to not forward subsequent packets for the bearer and/or flow to the CLASS-A/CLASS for classification and/or load balancing.

FORW-CL 310 can store the service chain label stack for the traffic and can install a flow and/or bearer rule into its internally maintained bearer/flow table, which can be used for subsequent packet matching. Once a bearer and/or flow is classified to a particular service chain (e.g., has been assigned a service chain label stack), its packets are forwarded towards the appropriate FORW-ST (e.g., FORW-ST (1) 314 for the embodiment shown in FIG. 1A) for the service chain and service path (if load balanced) to which the traffic has been classified and/or load balanced.

In some cases, one or more service functions for a service path may fail, become overloaded, etc. In such cases, CLASS-A/CLASS might send FORW-CL 310 a flag or other indication to flush an existing classification and service chain label stack for a given bearer and/or flow and to send CLASS-A/CLASS a next packet for the given bearer and/or flow in order to load balance the traffic again. In still some embodiments, policy and/or charging information for a given bearer and/or flow may change, which may trigger CLASS-A/CLASS to send FORW-CL 310 a flag or other indication to flush an existing classification and service chain label stack for the given bearer and/or flow and to send CLASS-A/CLASS a next packet for the given bearer and/or flow in order to load balance the traffic again.

In an embodiment in which a selected service chain connects to GW(1) or GW(2), FORW-ST 314 can route the traffic to GW(1) 212 for 3GPP slow-path data-plane processing or to the GW(2) 214 for fast-path data-plane processing for user plane traffic handling. After processing by GW(1) 212 or GW(2) 214, the traffic can either be directed out of the mobile service infrastructure 50 on the first path egress(1) interface 315 or can be directed to the FORW-ST (2) 316 of the forward path intermediate compute node 52 for processing by the VNFCI(2) 222. Determination of whether the traffic is to be directed out of the mobile service infrastructure or to FORW-ST(2) can be based on information included in a service chain label (e.g., NSH header) of the label chain stack for the traffic.

In some embodiments, one or more flow steering functions (e.g., any of FORW-ST(1)-FORW-ST(3) can be configured to manipulate a label stack to remove a label from the label stack once packets have reached a multiplexing point. Removing a label from a label stack can be referred to herein as performing a label 'pop' or a NSH label pop to remove an outermost label from the label stack. For example, consider an embodiment in which after processing traffic at VNFCI 222, the traffic is directed by FORW-ST(2) 316 to FORW-ST(3) 318 of forward path egress compute node 53 for processing by VNFCI(2) 224. Upon completion of the processing, the service chain label stack can be 'popped' to reveal the egress attachment circuit label for the traffic. Three multiplexing points are shown in the embodiment illustrated in FIG. 1A for processing forward path traffic.

In one embodiment, multiplexing points can exist at the first egress(1) interface 315 configured for FORW-ST(1) 314; between FORW-ST(1) 314 and FORW-ST(2) 316 for the embodiment shown in FIG. 1A in which GW(1) 212 and GW(2) 214 can be associated with mobile packet core service functions and VNFCI(1) 222 and VNFCI(2) 224 can be associated with Gi-LAN service functions; and at the second egress(2) interface 319 configured for FORW-ST(3) 318. Thus, traffic for a bearer and/or flow can be steered into a different service chain or set of service chains to perform certain Gi-LAN services on the traffic. The multiplexing points for the embodiment shown in FIG. 1A for forward path processing are provided for illustrative purposes only. It should be understood that different multiplexing points can exist depending on the types of service chains and/or set(s) of service chains provided for a given mobile service infrastructure deployment.

Generally, once a given service chain label stack has been added to a given IP or encapsulated GTP packet, the outermost label can be used for steering the packet flow. As noted, each service in a given service chain can be numbered and, as the packet progresses through the service chain, a service number carried in an outermost NSH label can be monotonically decremented. At the end of the given service chain (e.g., when there are no more services to be applied to the packet), the outermost NSH label can be popped from the label stack for the packet. In one embodiment, an outermost label can be configured to indicate if additional NSH label(s) are present for a label stack. In one embodiment, if another IETF SFC NSH label is present for a label stack after a previous label is popped from the stack, then the subsequent NSH label can become the new outermost NSH label for the stack. In one embodiment, a last NSH label for a label stack can be configured to provide information regarding an egress attachment circuit (e.g., the Internet, an enterprise network, etc.) for traffic.

In some cases, a mobile packet core or mobile packet core services can be considered an application that leverages subscriber policies to deliver 3GPP services to subscribers, while Gi-LAN side services or service function can be associated with value-added services that can be implemented on subscriber traffic. Thus, classification and load balancing decisions can differ for mobile packet core and Gi-LAN side services. For example, bearers may be served jointly in a mobile packet core yet its embedded may need to split over multiple service chains for Gi-LAN services and egress routing. In at least one embodiment, mobile service infrastructure 50 can be modeled as a DAG, as discussed in further detail herein, which can provide for identifying one or more concatenated paths through the DAG by stacking service path selections (e.g., NSH service chain label stacking) for mobile packet core services, Gi-LAN services and egress routing separately.

In a DAG, a vertex can be considered to hold or implement a service (e.g., mobile packet core or Gi-LAN service) and edges can be considered pathways that lead traffic from service to service. A set of edges can form a directed path through the DAG. The directed path can be considered a service chain that can be identified by a label (e.g., a service chain label) through the DAG. Generally, when packets enter the mobile service infrastructure fora given DAG, a first classifier/load-balancer vertex associates the packet's bearer and/or flow to a service chain and steers the packets for the bearer and/or flow into the service chain. Nodes (e.g., forwarding/compute nodes) within the mobile service infrastructure can steer the packets over the edges through the services to an egress using the assigned service chain label. Each decision point for a given DAG can correspond to a vertex multiplexing point. In various embodiments a vertex multiplexing point can includes multiplexing points for a classifier/load balancer, mobile packet core services, Gi-LAN services and egress attachment circuit selection.

In at least one embodiment, a mobile packet core can additionally leverage subscriber policies to steer (e.g., classify and load balance on a per-subscriber and/or flow basis) subscriber traffic through one or more Gi-LAN service functions, which can be intermixed with mobile packet core service functions. In such an embodiment, a Gi-LAN service infrastructure can acts as part of the PCEF. In another embodiment, mobile packet core service functions can also be configured to only provide Gi-LAN classification and load-balancing functions in combination with Gi-LAN services. In such an embodiment, Gi-LAN services can operate as a TDF. In yet another embodiment, Gi-LAN services can be extended only with a load balancer for an embodiment in which configuration as a TSSF is needed. Thus, in various embodiments, mobile packet core service functions and Gi-LAN service functions need not be separated or modeled as service functions limited only to mobile packet core service chains/functions or service functions limited only to Gi-LAN service chains but rather can be combined and/or configured to provide any desired combination of mobile packet core and/or value-added services.

In accordance with various embodiments, communication system 10 via mobile service infrastructure 50 can provide several unique features for hosting mobile packet core and value-added services using SDN service chaining over current deployments. First, mobile service infrastructure 50 can, in various embodiments, facilitate mobile packet core fast-path and/or slow-path service functions using independent service chains (e.g., hosted on IETF SFC NSH service chains). In various embodiments, mobile service infrastructure 50 can support the coexistence of multiple types and/or instances of fast-path and slow-path service chains, each being configured with specific optimized (data-plane) functionality.

Further, mobile service infrastructure 50 can, in various embodiments, provide for extending service chains to include different combinations of independent processing entities that can provide one or more service functions that are traditionally part of a mobile packet core (data-plane) along with one or more service functions that are traditionally part of a Gi-LAN service infrastructure. Using NSH-based service chains, mobile service infrastructure 50 can, in various embodiments, facilitate connecting service functions together and, when combined with a classifier/load balancer, can achieve providing selectivity on a bearer-by-bearer and/or flow-by-flow basis by assigning appropriate service chain labels to subscriber traffic.

In some embodiments, mobile service infrastructure 50 can support user-plane functions for architectures having split control and user-plane functionality. Typically, various control functions for a 3GPP LTE network having a separated Control/User plane mobile packet core can include control-plane related elements or nodes such as, for example, a Mobility Management entity (MME), a segregated control-plane SGW (SGW-C), a segregated control-plane PGW (PGW-C) and/or a segregate control-plane SAE GW (SAEGW-C) controller (once defined), and can include policy related elements or nodes such as, for example, Authentication, Authorization and Accounting (AAA) elements, PCRFs, OCSs and/or OfCSs. Typically, the data-plane and services functions associated thereto can include all data-plane and service related functions, which can include, but not limited to, standard IP routing, IETF SFC NSH service chain handling for mobile packet core and Gi-LAN services, GTP packet processing, and/or providing value-added services typically supported in Gi-LAN service areas.

In various embodiments, mobile service infrastructure can support control-plane functions that may use service chain functions for routing and steering control-plane messages (e.g., GTP-C and DIAMETER) under control of at least one CLASS 110 and/or at least CLASS-A 210 to support 3GPP network slicing. By separating control-plane and data-plane functions for a mobile service core, the data-plane can be optimized and scaled independently of the control-plane, which can improve resource usage in the network resulting in a better user experience at a lower cost compared to a system where control- and data-plane functionality grow in an approximately simultaneous manner. In various embodiments, control functions of a mobile packet core can be collocated with other policy, profile and charging elements. In a virtualized deployment including control and/or data-plane service functions, mobile service infrastructure 50 can enable advantages of scaling and flexibility that virtualization can provide and can enhance packet forwarding capacity by providing selective bearer and/or flow subscriber traffic steering.

Referring to FIG. 1B, FIG. 1B is similar to FIG. 1A but illustrates an example use case in which mobile service infrastructure 50 is configured to facilitate reverse path processing for reverse path user data-plane traffic received from Internet and/or enterprise network(s) 40. The data-plane traffic can be steered to service provider network 30 for delivery to UE 20. The embodiment shown in FIG. 1B includes mobile service infrastructure 50, which can include forwarding node 51, a reverse path intermediate compute node 54 and a reverse path egress compute node 55.

Forwarding node 51 includes FORW-CL 310 configured with ingress interface 311 and FORW-ST(1) 314 configured with egress(1) interface 315, GW(1) 212 and GW(2) 214. For the embodiments shown in FIGS. 1A-1B, egress(1) interface 315 can be configured to provide egress processing for both forward path (e.g., for interfacing with Internet/enterprise network(s) 40) and reverse path traffic (e.g., for interfacing with service provider network 30). Reverse path intermediate compute node 54 includes FORW-ST(3) 318 and VNFCI(2) 224. For the reverse path processing embodiment shown in FIG. 1B, FORW-ST(3) 318 is not configured to provide egress processing but rather is configured to steer reverse path traffic to FORW-ST(2) 316. For the embodiment shown in FIG. 1B, reverse path egress compute node 55 includes FORW-ST(2) 316 configured with a third egress (3) interface 317 and VNFCI(1) 222. Third egress(3) interface 317 can provide egress processing for service provider network 30 (e.g., an egress attachment circuit for reverse path traffic). Similar to the embodiment shown in FIG. 1A, VNFCI(2) 224 and VNFCI(1) 222 can be associated with Gi-LAN services and GW(2) 214 and GW(1) 212 can be associated with mobile packet core services (e.g., fast-path and/or slow-path services).

During operation in at least one embodiment for reverse path traffic, ingress traffic can be received at ingress interface 311 of forwarding node 51. Reverse path flows and/or bearers can be similarly classified and/or load balanced via FORW-CL 310, CLASS 110 and/or CLASS-A 210 (if configured) relative to forward path flows and/or bearers. Once classified and/or load balanced, bearers and/or flows can be directed to the tail of the service path rather than the head and progress in reverse order (e.g., the mobile service DAG is reversed). Traffic can be egressed either at the end of the Gi-LAN services (e.g., for a standalone TDF mode) via FORW-ST(2)/egress(3) or via mobile packet core service(s) and forwarded towards the service provider network 30.

Multiplexing points for reverse path processing can be different than multiplexing points configured for forward path processing. For example, in one embodiment multiplexing points for reverse path traffic can exist at the third egress(3) interface 317 configured for FORW-ST(1) 314; between FORW-ST(2) 316 and FORW-ST(1) 314; and at the first egress(1) interface 315 configured for FORW-ST(1) 314. Each of the multiplexing points can be points at which a label pop can be performed on a service chain label stack configured for reverse path packets.

Although only one ingress interface (e.g., ingress interface 311) is shown in FIGS. 1A-1B, it should be understood that there can be more than one ingress network that can providing connectivity to access networks (e.g., different access point names (APNs), Multi-Operator Core Network (MOCN), network slicing, Dedicated Core (DECOR)). Further, additional egress networks can be provided.

In general, service provider network 30 may provide a communications interface between UE 20 and mobile service infrastructure 50 for one or more 3GPP and/or non-3GPP Radio Access Networks (RANs). In various embodiments, 3GPP access networks can include a GSM EDGE Radio Access Network (GERAN), a UMTS Terrestrial Radio Access Network (UTRAN), generally referred to as 3G, and/or a LTE access network such as evolved-UTRAN (E-UTRAN), generally referred to as 4G, LTE/LTE-Advanced (LTE-A) and/or 5G. In various embodiments, non-3GPP access networks can include wireless local area networks (WLANs), such as 802.11 Wi-Fi networks, HotSpot networks, etc., Worldwide Interoperability for Microwave Access (WiMAX) networks, Bluetooth™ networks, combinations thereof or the like. In various embodiments, service provider network 30 can also include one or more control and/or control-plane elements (e.g., for virtualized architectures) such as for example, functionality (physical and/or virtual) one or more MME(s). In various embodiments, an MME can provide for UE tracking and paging procedures including, for example, retransmissions, tracking area list management, idle mode UE tracking, etc. An MME can further provide for UE bearer procedures including activation, deactivation and modification, SGW and PGW selection for UE and authentication services.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 20 can be associated with any users, subscribers, employees, clients, customers, electronic devices, etc. wishing to initiate a flow in communication system 10 via some network. In at least one embodiment, UE 20 is configured to facilitate simultaneous Wi-Fi connectivity and cellular connectivity within communication system 10. The terms 'user equipment', 'mobile node', 'mobile station' or 'mobile device' are inclusive of devices used to initiate a communication, such as a computer, an electronic device such as a parking meter, vending machine, appliance, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 10. UE 20 may also be inclusive of a suitable interface to a human user such as a microphone, a display, a keyboard, or other terminal equipment.

UE 20 may also be any device that seeks to initiate a communication on behalf of another entity or element such as a program, a database, or any other component, device, element, or object capable of initiating an exchange within communication system 10. In certain embodiments, UE 20 may have a bundled subscription for network access and application services (e.g., voice), etc. In one embodiment, once the access session is established, the user can register for application services as well, without additional authentication requirements. Within communication system 10, IP addresses (e.g., for UE or any other element in communication system 10) can be assigned using dynamic host configuration protocol (DHCP), Stateless Address Autoconfiguration (SLAAC), during default bearer activation processes, etc., or any suitable variation thereof. IP addresses used within communication system 10 can include IP version 4 (IPv4) and/or IP version 6 (IPv6) IP addresses.

Figure 2:
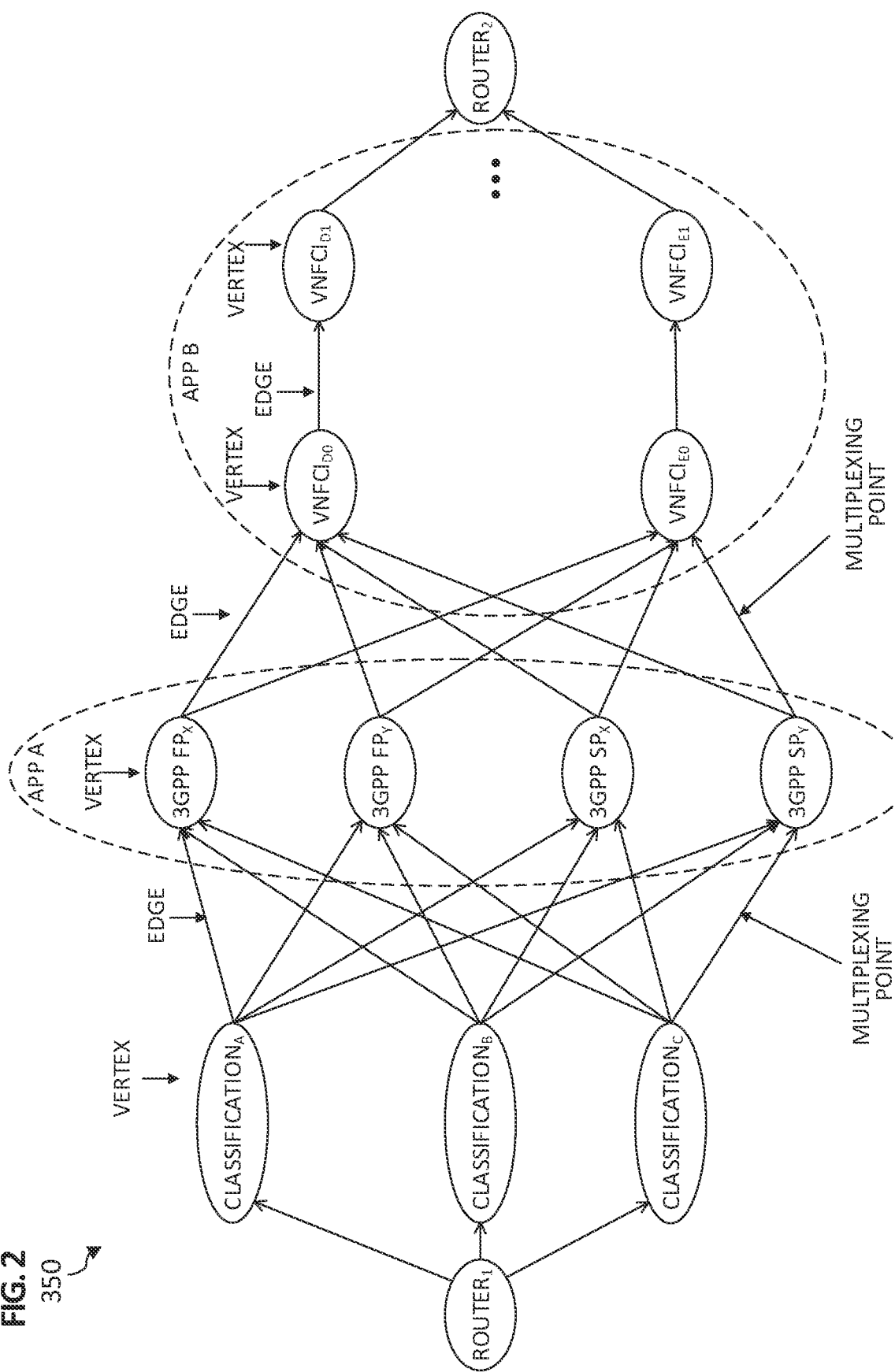
FIG. 2 is a simplified schematic diagram illustrating an example Directed Acyclic Graph (DAG) in accordance with one potential embodiment.

Referring to FIG. 2, FIG. 2 is a simplified schematic diagram illustrating an example Directed Acyclic Graph (DAG) 350 that can be associated forward path processing that can be performed by mobile service infrastructure 50 in accordance with one potential embodiment. A vertex of DAG 350 can be considered to hold or implement a service (e.g., mobile packet core or Gi-LAN service) and edges can be considered pathways that lead traffic from service to service. A set of edges can form a directed path through the DAG. The directed path can be considered a service chain that can be identified by a label (e.g., a service chain label) through the DAG. Nodes (e.g., compute nodes) within the DAG can steer the packets over the edges through the services to an egress using an assigned service chain label.

In various embodiments, DAG 350 may be based on IETF SFC NSH service chains or service chaining solutions with similar functionality. Management of the DAG 350 can be facilitated through a service chaining management system (not shown), which may be based on an ETSI-NFV orchestration system. DAG 350 illustrated for the embodiment shown in FIG. 2 includes two applications, Application A (APP A) and Application B (APP B). In at least one embodiment, Application A can implement mobile packet core service functions including slow-path services ($SP_X$ and $SP_Y$) and fast-path services ($FP_X$ and $FP_Y$) and Application B can implement Gi-LAN service functions hosted on multiple service chains ($VNFCI_{D0}$, $VNFCI_{D1}$ on a first service chain and $VNFCI_{E0}$, $VNFCI_{E1}$). DAG 350 includes classification nodes ($CLASSIFICATION_A$, $CLASSIFICATION_B$, $CLASSIFICATION_C$), which represent initial classification nodes for the mobile packet core service functions combined with Gi-LAN service functions. In various embodiments, a classification node can include functionality for any combination of a CLASS, CLASS-A and/or FORW-CL as discussed for various embodiments described herein. Routers ($ROUTER_I$, ROUTER) can facilitate ingress/egress processing DAG 350.

In a general DAG, each vertex can support multiple egress multiplexing points. A vertex with N|N>1 egress edges allows the vertex to select between multiple paths to subsequent vertices. Each decision point for DAG 350 can correspond to a vertex multiplexing point. In various embodiments a vertex multiplexing point can include multiplexing points for a classifier/load balancer, mobile packet core services, Gi-LAN services and egress attachment circuit selection. Generally, when packets enter the mobile service infrastructure for DAG 350, a first classifier/load-balancer vertex at the ingress for the mobile service infrastructure can associate the packet's bearer and/or flow to a service chain and steers the packets for the bearer and/or flow onto the appropriate DAG edge (e.g., the appropriate FORW-ST) for a selected service chain/service chain path.

Thus, when applied to mobile service infrastructure 50, which can be configured with various mobile packet core and/or Gi-LAN services, there can be multiple vertices with N|N>1 such as, for example, at the classifier/load balancer for the ingress of the mobile service infrastructure, at the boundary between mobile packet core and/or Gi-LAN services and/or at egress routing that allows for switching traffic across multiple paths. More multiplexing points may exist in accordance with various embodiments of mobile service infrastructure 50.

In one embodiment, multiplexing vertices each can make their own egress decision. In such an embodiment, the first multiplexing point (e.g., the classifier/load balancer) may only select a first egress edge and subsequent multiplexing points can each make their own steering decisions. In another embodiment, the first multiplexing point (e.g., the classifier/load balancer) can make a single decision for all multiplexing points in the DAG and can construct a stack of service chain decisions configured as service chain labels (e.g., a service chain label stack) to route packets through the DAG. At each multiplexing point, the vertex can pop the label stack to find the next egress edge.

In various embodiments, service functions, or vertices, connected to the DAG can include mobile packet core service functions such as GTP-U fast-data-path, GTP-U slow-data-path, and/or value-added services such as deep packet inspectors, firewalls, network address translators, charging functions, etc. In various embodiments, classification nodes (e.g., CLASS 110, CLASS-A, FORW-CL) can be considered an independent service, or vertex, connected to the DAG, which may also be configured as a multiplexing point (e.g., to perform classification/load balancing to select an appropriate FORW-ST for a give service chain or set of service chains).

In one embodiment, a mobile service infrastructure DAG may be based on IETF SFC/NSH service chains, which can host data-plane functions associated with mobile packet core and/or Gi-LAN services for implementation of a PCEF, TDF and/or TSSF. In one embodiment, a functional element referred to as a Service Function Forwarder (SFF) together with the Service Function (SF) defines a DAG vertex. In various embodiments, an SFF can include functionality similar to any other forwarding function (e.g., FORW-CL, FORW-ST) as described herein.

As noted previously, a service path identifier (SPI) can identify a network path through an IETF SFC NSH DAG, and a stack of service path identifiers of length 1 or greater may define an end-to-end path through the DAG. As discussed herein, service modules or service functions can be virtual or physical in accordance with various embodiments. Depending on the mobile packet core services that are to be provided for a particular flow and/or bearer (e.g., based on the bearer and/or flow classification) the flow and/or bearer can be steered onto the appropriate service chain path(s) via service chain label(s) constructed for a service chain label stack for packets for the flow and/or bearer. Each service or service function on the selected service chain can then provide its specific operations to the flows and/or bearers steered through the service.

In at least one embodiment, mobile service infrastructure can support augmenting IETF SFC NSH service chaining with service functions to support mobile packet core off-loads of flow-by-flow and/or bearer-by-bearer to a service chain fast-path service function. In such embodiments, off-load can be defined in terms of the IETF SFC NSH offload techniques, such that an SFF may bypass the SF for selected bearers and/or flows.

Without loss of generality, the capacity of a DAG (e.g., DAG 350) or parts thereof can be increased in accordance with various embodiments by replicating the entire DAG, or the DAG can be extended dynamically with multiple vertices and edges for a given service in places where bottlenecks may occur. Similarly, the capacity can be reduced in accordance with various embodiments by selectively removing parts of the DAG by removal of selected vertices and associated edges. In other embodiments, a particular service (e.g., an IETF SFC NSH SF) can also be part of multiple service chains. In such embodiments, multiple vertices may share a same service function, which removes the requirement typically found in current designs where service modules are often duplicated unnecessarily. In such embodiments, a vertex can be capable of disambiguating between multiple service paths while sharing a same service function.

While the foregoing is described in connection with mobile networks, this is not meant to limit the broad scope of the present disclosure. In various embodiments, mobile service infrastructure 50 can be applied to any tunnel-terminated and service chain based deployments, and/or can be applied to wireline networks.

Figure 3:
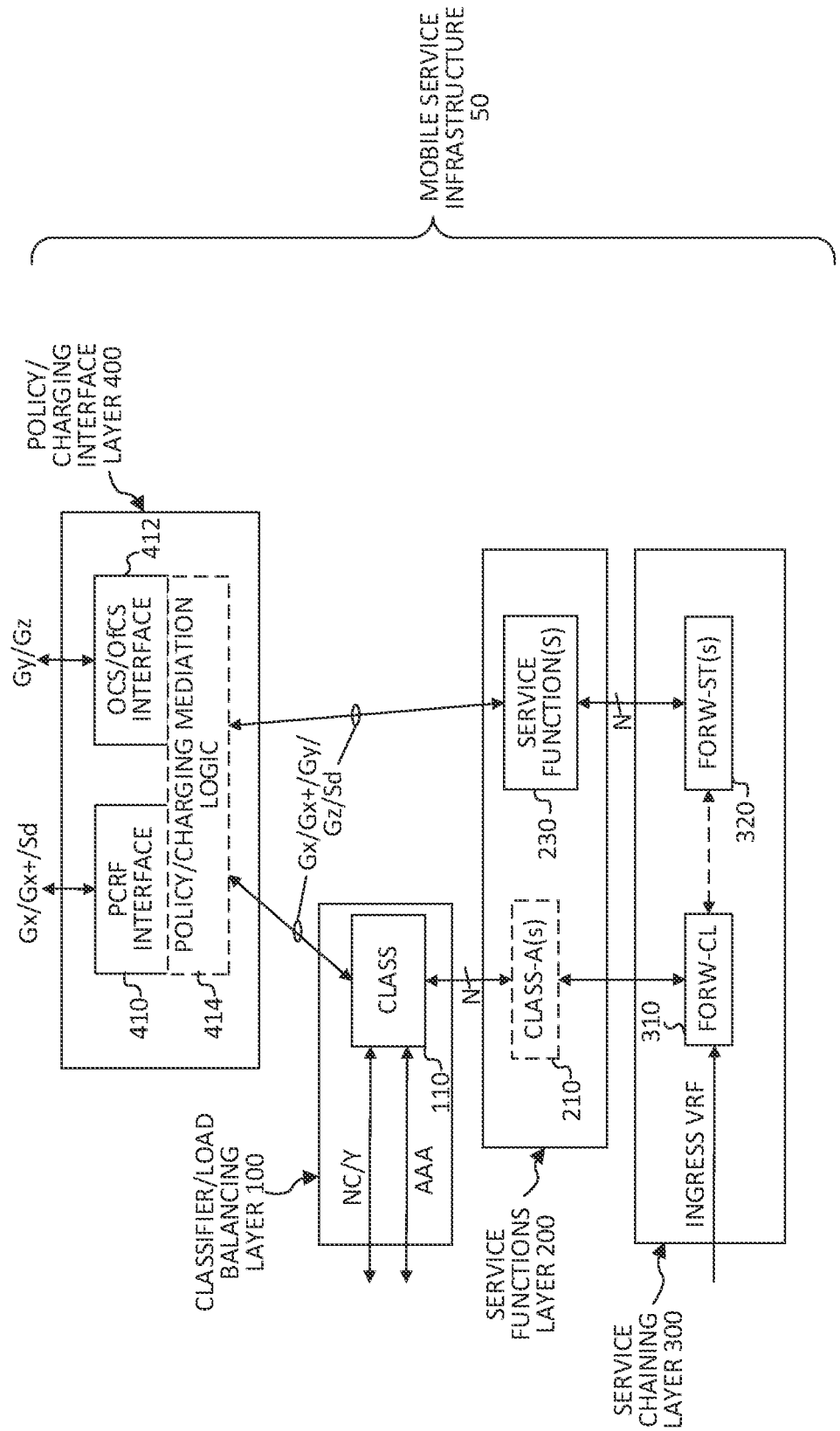
FIG. 3 is a simplified block diagram illustrating example details that can be associated with policy and charging management handling and mediation in accordance with one potential embodiment of the mobile service infrastructure.

Referring to FIG. 3, FIG. 3 is a simplified block diagram illustrating example details that can be associated with policy and charging management handling and mediation in accordance with one potential embodiment of mobile service infrastructure 50. For the embodiment shown in FIG. 3, mobility service infrastructure 50 can include classifier/load balancing layer 100, service functions layer 200, service chaining layer 300 and a policy and/or charging (policy/charging) interface layer 400.

Classifier/load balancing layer 100 can include CLASS 110, which can interface with various orchestration, management and/or modeling entities (not shown) via NC/Y signaling and/or AAA signaling. In various embodiments, orchestration and or management entities can include Operations, Administration and Management (OAM) entities, Operation Support System (OSS) entities, ETSI NFV orchestration and management entities, one or more Subscriber Profile Repository(s) (SPR(s)) such as Home Location Register(s) (HLR(s)) and/or Home Subscriber Server(s) (HSS(s)), one or more 3GPP AAA element(s), servers and/or databases, combinations thereof or the like. Service functions layer 200 can include one or more CLASS-A(s) 210 and one or more service function(s) 230, which can be any combination of physical and/or virtual GW(s) and/or VNFCI(s). Service chaining layer 300 can include FORW-CL 310 and one or more FORW-ST(s) 320. Policy/charging interface layer 400 can include a PCRF interface 410 and an OCS/OfCS interface 412. In at least one embodiment, policy/charging interface layer 400 can include a policy/charging mediation logic 414, which can be configured to mediate between PCRF interface 410 and OCS/OfCS interface 412 to serve as an anchor point for service function policy and/or charging information and to mediate complex policy and/or charging operations and/or translation services.

In various embodiments, FORW-CL 310 can interface CLASS 110 and/or with one or more CLASS-A(s) 210. In various embodiments, CLASS 110 can interface with PCRF interface 410 and OCS/OfCS interface 412 or policy/charging mediation logic 414 (if configured) via any of a Gx, Gx+, Gy, Gz and/or Sd interface, as defined by 3GPP standards. FORW-CL 310 can also interface with one or more FORW-ST(s) 320 and one or more FORW-ST(s) can interface with one or more service function(s) 230 as discussed for various embodiments described herein. Each of the one or more service function(s) 230 can interface with PCRF interface 410 and OCS/OfCS interface 412 or policy/charging mediation logic 414 (if configured) via any of a Gx, Gx+, Gy, Gz and/or Sd interface, as defined by 3GPP standards.

As discussed for various embodiments described herein, FORW-CL 310 is the first point of contact for arriving packets. It may provide an input Virtual Routing Forwarding (VRF) abstraction and interfacing with CLASS 110 and/or one or more CLASS-A(s) 210, if deployed. In one embodiment, FORW-CL 310 can interface with CLASS-A(s) 210 via an IETF SFC NSH interface and CLASS-A(s) 210 can interface with CLASS 110 via any of the OpenFlow™, GTP control-plane (GTP-C) and/or the Netconf/Yang (NC/Y) standards.

During operation, in at least one embodiment in which at least one CLASS-A 210 is deployed, the at least one CLASS-A 210 can be configured to "pull" policy and/or charging information associated with classification and/or load balancing decisions from CLASS 110. Alternatively, in another embodiment, CLASS 110 can be configured to "push" policy and/or charging information associated with classification and/or load balancing decisions to at least one CLASS-A 210 during, for example, Packet Data Protocol (PDP) context activations for subscriber(s). In some embodiments, PCRF state may be dynamically be pushed from a PCRF (not shown) through the (optional) policy/charging mediation logic 414 into CLASS 110, in which case CLASS 110 may update CLASS-A(s) 210 with the PCRF state. In other embodiments, in which no CLASS-A(s) are deployed, CLASS 110 can update FORW-CL 310 directly.

In various embodiments, service function(s) 230 can be configured to pull and/or push policy and/or charging information from/to a PCRF (not shown), an OCS (not shown) and/or an OfCS (not shown) via PCRF interface 410 and/or OCS/OfCS interface 412 or policy/charging mediation logic 414, if configured.

Figure 4:
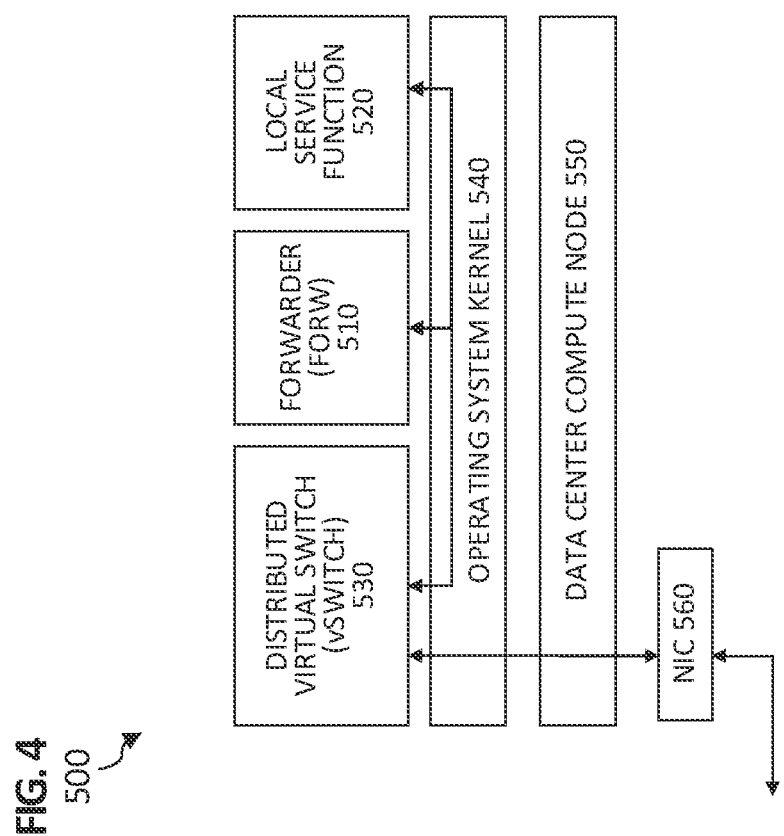
FIG. 4 is a simplified block diagram illustrating example details that can be associated with packet routing for inter-/intra-host use cases in accordance with various potential embodiments of the mobile service infrastructure.

Referring to FIG. 4, FIG. 4 is a simplified block diagram 500 illustrating example details that can be associated with packet routing for inter- and/or intra-host use cases in accordance with various potential embodiments of mobile service infrastructure 50. FIG. 4 includes a forwarder (FORW) 510, a local service function 520, a distributed virtual switch (vswitch) 530, an operating system kernel 540, a data center compute node 550 and a Network Interface Card (NIC) 560. In at least one embodiment, vswitch 530 can be a VNF. In various embodiments, local service function 520 can be a CLASS, a CLASS-A, a virtual machine or container configured to provide a 3GPP fast-path or slow-path service, a value-added service or any combination thereof.

In at least one embodiment, FORW 510 can be configured with packet-forwarding functionality within a given service chain and can determine where to route traffic for bearers and/or flows based on a service path identifier embedded in a service chain label stack. In such an embodiment, a VRF can be configured for FORW 510 such that FORW 510 is a FORW-ST. In another embodiment, FORW 510 can be configured with flow and/or bearer classification functionality along with packet forwarding functionality. In such an embodiment, a VRF can be configured for FORW 510 such that FORW 510 is a FORW-CL. In still another embodiment, FORW 510 can be configured with multiple VRFs having any combination of classification and/or forwarding capabilities such that FORW 510 can be any of one or more FORW-CL(s) and/or one or more FORW-ST(s). In some embodiments, vswitch 530 and FORW 510 can be deployed as one entity or node.

In at least one embodiment, service (e.g., operation, processing) can be realized when the vswitch 530, FORW 510 and each of one or more mobile packet core and/or Gi-LAN services (e.g., embodied by various service functions) may be hosted as independent operating system processes, containers and/or virtual machines on operating system kernel 540 that runs on data center compute node 550 having network interface card (NIC) 560. In at least one embodiment, a fast kernel-hosted interconnect may be employed, potentially using shared memory between the processes (e.g., containers), which can enable efficient communication paths between the independent processes. In at least one embodiment, functionality provided by vswitch 530, which can potentially be configured with functionality of FORW 510, can be part of the operating system kernel 540. In another embodiment, functionality provided by vswitch 530, which can potentially be configured with functionality of FORW 510, can be provided by an external (physical) network function, which can use Layer-2 (L2) networking techniques to communicate with the virtual network function.

In some embodiments, a service function (e.g., which can include a CLASS-A and/or CLASS) can be configured with the ability to classify and/or load balance bearers and/or flows by updating an outgoing packet carrying an IETF SFC NSH. In such embodiments, when FORW-CL function(s) or FORW-ST function(s) of FORW 510 are configured to accept such dynamic classification changes, FORW 510 can dynamically update internal flow mapping tables maintained by FORW 510 with an updated service chain label stack provided by the service function. In some embodiments, this functionality can be used for basic classification and/or load-balancing purposes as functionality provided by CLASS/CLASS-A and/or can be used to dynamically reroute specific packet bearers and/or flows and/or, if needed, to bypass one or more specific downstream service function(s) in case a flow-offload is not or cannot be used. In at least one embodiment, flow bypass can be used in a case in which a downstream service node does not provide NSH functionality (e.g., is non-NSH-capable). In such a case, an upstream NSH-capable service node can indicate a new path that excludes the non-NSH-capable service node.

During operation in various embodiments, on detection of a new bearer and/or flow by FORW 510 (e.g., configured as a FORW-CL) such as, for example, a first-sign-of-life (FSOL) packet (e.g., GTP-C, GTP-U, IP) is received from a mobile device (e.g., UE 20) through vswitch 530 by FORW 510 configured as a FORW-CL from an ingress attachment circuit (e.g., service provider network 30, RAN) or when the classification and/or load balancing decision for a bearer and/or flow is absent for the classifying functionality for FORW 510 on arrival of any packet, then the packet is directed to CLASS-A/CLASS via a default service path by the classifying functionality. Such a packet is directed to CLASS/CLASS-A to obtain an appropriate classification and/or load balanced service chain label stack for use by the classifying functionality. Upon receiving a first packet, the CLASS/CLASS-A can, in various embodiments as discussed herein, determine how to route, or classify and/or load-balance the flow and/or bearer. The CLASS/CLASS-A can associate an NSH service chain label stack to the bearer and/or flow; constructs the NSH service chain label stack; informs the originating classifying functionality for FORW 510 of the flow and/or bearer's classification; offloads the flow/bearer to classifying functionality for FORW 510; and returns the first packet including the NSH service chain label stack to the routing infrastructure.

The classifying functionality configured for FORW 510 can route all subsequent packets associated with the classified and/or load balanced bearer and/or flow through the same service path for mobile packet core data-plane and/or Gi-LAN services given the IETF SFC NSH label stack associated with the bearer and/or flow that was installed in FORW-CL based on the FSOL packet. Given that a given service path, as identified by a given label stack, may include one or more mobile packet core and/or Gi-LAN services, tailored mobile packet core and/or Gi-LAN service(s) can be defined and applied to a specific flow and/or bearer without each service needing to interact with the classifier CLASS/CLASS-A at each hop in the service chain in some cases. However, for cases in which a reclassification may needed for a particular bearer and/or flow (e.g., via a policy and/or charging infrastructure), routing entries in the FORW-CL functionality can be discarded and any subsequent packet for the particular bearer and/or flow can be directed to the CLASS/CLASS-A again for re-classification and/or load balancing.

Generally, a 3GPP mobile packet core groups sets of flows through a bearer and identifies a bearer by a GTP TEID, as defined in 3GPP TS 29.060, TS 23.401 and other 3GPP Technical Specifications. In some embodiments, alternate bearer and/or flow aggregators can be provided in mobile service infrastructure 50 for non-3GPP standards-based classifications. A bearer and flow (e.g., an end-to-end conversation) for a mobile packet core network can, in various embodiments, be identified by an ingress attachment circuit identifier and/or a GTP-U TEID in combination with an embedded 5-tuple flow mask that identifies a source-IP address, a destination-IP address, a source-port, a destination-port and a transport protocol for a packet. A 5-tuple flow mask in combination with a GTP-U TEID is referred to as a 6-tuple and a 5-tuple in combination with an ingress attachment circuit identifier and a GTP-U TEID is referred to as a 7-tuple flow mask.

On the Gi-LAN side, a flow can, in various embodiments, be identified by an attachment circuit (e.g., virtual local area network (VLAN), Multiprotocol Label Switching (MPLS) label, etc.) identifier and 5-tuple flow mask. For the GTP-based 3GPP signaling plane (i.e., GTP-C), a bearer is comprised of one of more signaling sessions, yet these are usually treated as a single flow. Thus, to identify flows of a single bearer and to associate these with a service chaining label stack, mobile service infrastructure 50 can, in various embodiments, facilitate managing flows using a 5-/6- or 7-tuple flow mask.

A flow originating from an external network, an enterprise network or a Gi-LAN side service can, in various embodiments, be first matched in a classifier (e.g., FORW-CL); potentially using its attachment circuit identifier, before it is routed through IETF SFC NSH enabled mobile packet core and/or Gi-LAN services. In such embodiments, the CLASS/CLASS-A can makes a classification and/or load balancing determination based on the 5-tuple, and/or an ingress attachment circuit identifier and/or a TEID and can use IETF SFC NSH signaling to inform the FORW-CL functionality of FORW to inform it of its classification and load balancing decision with an NSH label stack.

In some embodiments, CLASS 110 may update an earlier classification and/or load balancing decision by instructing a given CLASS-A 210 and/or classifying functionality for FORW 510 to discard its cached flow and/or bearer classification stored in their routing tables. This can be needed if traffic needs to be routed differently and/or PCRF policies and/or charging need to be applied differently for a subscriber, bearer and/or its flows. Once flushed, subsequent packets on flows and/or bearers will then be missing in the routing table of the classifying functionality for FORW 510 and can be directed to the CLASS/CLASS-A for reclassification.

Routing specific flows and/or bearers onto service chains that include traditional mobile packet core service instances (e.g., virtual machines and/or physical nodes) can, in various embodiments, help to protect prior investments and can enable fine-grain future-investment decisions. Routing flows and/or bearers onto service chains that contain decomposed mobile packet core services and traditional mobile packet core instances can, in various embodiments, enable integration of old types and new types of deployments. Over time, traditional mobile packet core instances may be modularized further, up to the point that all traditional mobile packet core functions are implemented as independent service functions hosted on service chains.

For embodiments in which Gi-LAN services are included in mobile service infrastructure 50, the service DAG as depicted in FIG. 2 for the mobile packet core can be extended with a service graph for Gi-LAN services. The Gi-LAN-side services can be maintained in a similar manner as the mobile packet services. In one embodiment for northbound traffic, on an egress of mobile packet core (MPC) service(s) for forward path processing, flows can be reclassified for Gi-LAN service(s) and vice versa as per the service chain label stack described earlier. Thus, in such an embodiment, the traffic can be classified at an egress interface by querying the CLASS/CLASS-A again to classify and/or load balance the traffic towards a service path for one or more Gi-LAN service(s). Redirecting a bearer and/or flow on an egress of MPC service(s) towards Gi-LAN service(s) or vice-versa is a valuable feature of mobile service infrastructure 50 that can provide for malleable, optimized, and scalable mobile service (data-plane) delivery for a wide-range of mobile use cases/deployments. In other embodiments, for example, in cases in which MPC service(s) and Gi-LAN service(s) are integrated into one or more service chain(s), a single classification can be performed for a bearer and/or flow via CLASS/CLASS-A to classify and/or load balance traffic.

During operation in at least one embodiment, FORW-CL functionality for FORW 510 can use a 5-/6- or 7-tuple input packet to determine an appropriate IETF SFC NSH service path label stack in its routing table, assuming prior classification of the bearer and/or flow. FORW-ST functionality configured for FORW 510 can perform a look-up on the bearer and/or flow's label (e.g., using the IETF SFC NSH service-path-identifier (SPI) at the top of the label stack for the bearer and/or flow), can route packets to a service chain/service chain path connecting one or more services, and can either route the packet to the next FORW-ST in the service chain as described through its service graph, or can provide egress services towards the Gi-LAN side service graph and/or other networks.

In some embodiments, a separate management process and/or logic can ensure that an appropriate mobile service DAG (e.g., using IETF SFC NSH service chains) is maintained for mobile packet core and Gi-LAN services. In various embodiments, as discussed herein, a mobile service DAG can include 3GPP slow- and fast-path service(s), service chains, vswitch(es), FORW-CL(s), FORW-ST(s) and/or Gi-LAN value added service(s). In some embodiments, service chains may be infrequently established such that the management process and/or logic may use loading, time-of-day and/or any other techniques to determine when to provide scaling functionality. Similarly, in some embodiments, a separate management process and/or logic can intervene with CLASS and/or flow controllers in case failures of module(s), service(s), service chain(s), vswitch(es), FORW-ST(s), FORW-CL(s) and/or more traditional mobile packet core and/or Gi-LAN instance(s) are detected. In such embodiments, the management process and/or logic may alter the state of a mobile service DAG and/or additionally provision module(s), service(s), service chain(s), vswitch(es), FORW-ST(s), FORW-CL(s) and/or more traditional mobile packet core and/or Gi-LAN instance(s).

In some embodiments, by providing for the ability to modularize a mobile packet core into one or more services and hosting a monolithic mobile packet core using a service chaining solution, scaling of capacity can be made simpler than deployments that only include a monolithic mobile packet core. In such embodiments, the scaling of capacity can be facilitated by modularizing a mobile packet core into one or more service(s), instantiating new service instance(s), creating an appropriate mobile service DAG through the newly instantiated service instance(s), and deploying the service graph via a corresponding mobile service infrastructure. Similarly, reduction of capacity can be facilitated by adjusting a mobile service DAG to an appropriate capacity by discarding services and their associated service chains.

While embodiments discussed herein have been described in reference to newer 3GPP networks, in which all of the signaling and user-plane traffic is provided for via GTP-based tunnels, similar mechanisms can be used for older networks. For instance, for embodiments in which 2G and/or 3G 3GPP networks need to be supported, classification and load/or balancing agents can conform to Iu Packet Switched (IuPS) and Iu Circuit Switched (IuCS) standards without additional modifications.

Label Stacking

Figure 5:
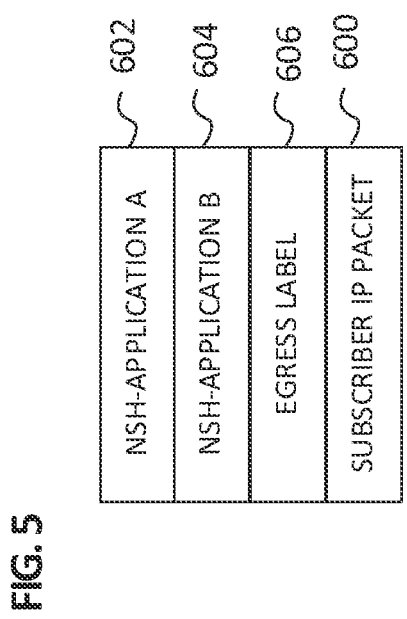
FIG. 5 is a simplified schematic diagram illustrating example details that can be associated with label stacking in accordance with one potential embodiment of the mobile service infrastructure.

Referring to FIG. 5, FIG. 5 is a simplified schematic diagram illustrating example details that can be associated with label stacking in accordance with one potential embodiment of mobile service infrastructure 50. Without loss of generality, consider an example composition of service chaining sets A and B as depicted in FIG. 2. Assume, for example, that set A contains a group of service chains that implement one application according to a given policy and set B implements another application according to a possibly different policy. The two applications A and B may be composed, for example, to implement a (virtualized) mobile packet core and a (virtualized) Gi-LAN system.

For the present example, assume a flow classifier (e.g., a CLASS) for application A encapsulates forward path packets for a given bearer and/or flow with an IETF SFC NSH for application A, an IETF SFC NSH for application B and an egress label, resulting in a stacked IETF SFC NSH. An example of such a stacked IETF SFC NSH is shown in FIG. 5, where a subscriber IP packet 600 is encapsulated with an IETF SFC NSH for application A (NSH-APPLICATION A) 602, an IETF SFC NSH for application B (NSH-APPLICATION B) 604 and an egress label 606. In various embodiments, an egress label can be a string (e.g., integer value) that can identify an egress attachment circuit (e.g., a PDN, the Internet, an enterprise network, etc.) for subscriber traffic. The IETF SFC NSH for application A can be referred to herein as an NSH label for application A and the IETF SFC NSH for application B can be referred to herein as an NSH label for application B.

As discussed above, once a label stack has been added to an IP or encapsulated GTP packet, the outermost label is used for steering the packet flow for one or more service chain(s) or set(s) of service chain(s). Each service (e.g., vertex) in a given service chain is numbered and, as a packet progresses through the service chain, a service index number for the outermost IETF SFC NSH is monotonically decremented at each service in the chain. At the end of the service chain (e.g., when there are no more services to be applied to a given packet) the outermost IETF SFC NSH, which contains a service index number equal can, in some embodiments, be popped from the stack. In some embodiments, as discussed in further detail below, an outermost label might not be popped from a stack before forwarding to a subsequent service chain or application.

An outermost IETF SFC NSH can indicate whether additional IETF SFC NSHs remain for a label stack such as for example, to identifying another service chain to operate on a packet to identify an egress attachment circuit for the packet. Once a label stack is popped (e.g., the outermost NSH is removed), a subsequent IETF SFC NSH in the label stack becomes the new outermost IETF SFC NSH and the packet is steered according to the new outermost IETF SFC NSH. For a label stack, the last IETF SFC NSH in the stack can be an egress label, which can provide information identifying an egress attachment circuit for a given packet (e.g., a VLAN tag that identifies the egress attachment circuit such as the Internet and/or an enterprise network, etc.).

For reverse path traffic, the order of NSH labels for the label stack can be reversed compared to the order of NSH labels for forward path traffic. In at least one embodiment, once a packet is classified and carries an IETF SFC NSH label stack, the packet is first sent to the last service in the service chain (e.g., the last service in the service chain for application B, in the present example). For the present example, as the packet progress back through the service chain and has been processed by service 0 for application B, the label stack is popped and steering for the next IETF SFC NSH in the label stack becomes available (e.g., forwarded to the for application A). Once all reversely ordered services have been applied to the packet, an egress attachment circuit is made available and the packet is routed on its egress network (e.g., sent towards the RAN).

Various example details that can be associated with label stacking features that can be implemented in accordance with various embodiments are discussed in further detail in FIGS. 6, and 7A-7J.

Referring to FIG. 6, FIG. 6 is a simplified block diagram illustrating example details that can be associated with an example logical network topology 700 in which label stacking can be implemented in accordance with one potential embodiment of the present disclosure. FIG. 6 includes a UE 702, a first attachment circuit 704, a second attachment circuit 706, one or more forwarding function(s) (FORW) 708, one or more classification function(s) (CLASS/CLASS-A) 710 (e.g., assuming at least one CLASS-A function is configured for the topology), an MPC application 712, a Gi-LAN application 714, one or more management system(s) 722, a PCRF interface 724, an OCS/OfCS interface 726, a PCRF 728, an OCS 730 and an OfCS 732. FORW 708 can be configured with flow classification logic (CL) 716, which can be configured to perform operations associated with bearer and/or flow classification for traffic (e.g., packets) received at an ingress interface. A bearer/flow table 720 can be configured for CL logic 716. FORW 708 can also be configured with steering logic (ST) 718, which can be configured to perform operations associated with steering traffic through logical network topology 700 and/or to an egress attachment circuit.

FORW 708 can interface with each of first attachment circuit 704, second attachment circuit 706, CLASS/CLASS-A 710, MPC application 712 and Gi-LAN application 714. For the embodiment shown in FIG. 6, it is assumed that UE 702 interfaces with the network topology via first attachment circuit 704. CLASS/CLASS-A 710 can further interface with PCRF interface 724 and OCS/OfCS interface 726. PCRF interface 724 can interface with PCRF 728. OCS/OfCS interface 726 can interface with OCS 730 and OfCS 732. In one embodiment policy/charging mediation logic 734 can be configured for topology 700 such that CLASS/CLASS-A 710 can interface with the logic, which can then interface with PCRF interface 724 and OCS/OfCS interface 726 for gathering policy and/or charging information from PCRF 728, OCS 730 and/or OfCS 732. Management system(s) 722 can interface with CLASS/CLASS-A 710, FORW 708, MPC application 712 and Gi-LAN application 714 to configure and manage: service chains and service functions (including multiple instantiations thereof) for MPC application 712 and Gi-LAN application 714, one or more FORW 708 and one or more CLASS/CLASS-A 710. In various embodiments, management system(s) 722 can include OAM entities, OSS entities, AFs, ETSI NFV orchestration systems, SPRs, AAA elements, combinations thereof or the like as discussed herein.

In various embodiments, MPC application 712 can be configured with a one or more service functions (physical and/or virtual), gateways (physical and/or virtual), service chains, service functions and/or service chain instances (e.g., multiple instantiations of a same service function and/or path to enable load balancing), slow-path service chains, fast-path service chains, combinations thereof or any other configuration as discussed herein. In various embodiments, Gi-LAN application 714 can be configured with a plurality of service functions (physical and/or virtual), service chains, service functions and/or service chain instances, combinations thereof or any other configuration as discussed herein.

In various embodiments, first attachment circuit 704 can be a RAN, a service provider network, combinations thereof or the like as discussed herein. In various embodiments, second attachment circuit 706 can be a PDN, the Internet, an enterprise network, a VLAN network, a VRF selector, an MPLS label, combinations thereof or the like as discussed herein and/or defined in IETF Request For Comments (RFC) 4364. Although only one FORW 708 is shown in the network topology 700, it should be understood that multiple, distributed forwarding functions can be provided for a given deployment in accordance with various embodiments, as discussed herein. Further only one CLASS/CLASS-A 710 is shown in the network topology 700, it should be understood that multiple, distributed classification functions can be provided for a given deployment in accordance with various embodiments.

Figure 7A:
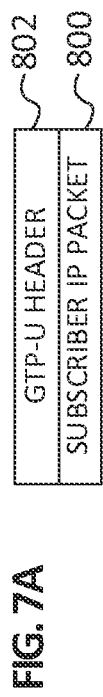
FIGS. 7A-7J are simplified schematic diagrams illustrating example details that can be associated with an example label stacking use case using the logical network topology of FIG. 6 in accordance with one potential embodiment.

Various example operations that can be associated with logical network topology 700 in accordance with various embodiments are discussed with reference to FIGS. 7A-7J, which illustrate example details that can be associated with a subscriber's IP packet 800 for a subscriber associated with UE 702 as the packet traverse logical network topology 700. Labels (1)-(22) are shown in FIG. 6 to identify various example operations that can be performed in accordance with one example embodiment. For logical network topology 700 assume an operational example in which subscriber IP packet 800, as shown in FIG. 7A, is sent (1) from UE 702 and is received via first attachment circuit 704 at FORW 708 (e.g., via an ingress interface of FORW 708). Subscriber IP packet 800 includes a GTP-U header 802. The GTP-U header 802 can carry, among other information, a TEID associated with the packet and/or an ingress attachment circuit identifier. In some embodiments, a TEID can be a Fully Qualified TEID (F-TEID) identifying the fully qualified domain name of an endpoint to which the packet should be routed.

Figure 7B:
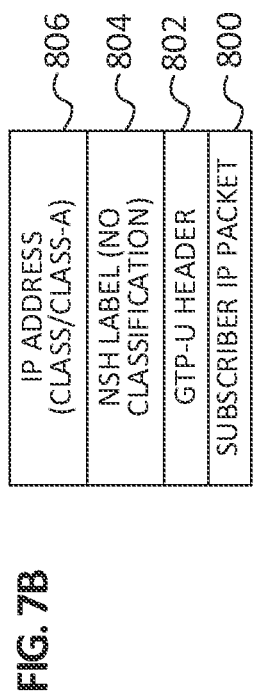

Upon receiving packet 800 including GTP-U header 802, CL logic 716 can attempt to determine a service chain classification for the packet by performing a look-up (2) on bearer/flow table 720 using 5-/6- or 7-tuple (depending on configuration) identifying information for the packet/GTP-U header. For the present operational example, it is assumed that packet 800 received at (1) is a first packet received for the subscriber associated with UE 702; thus, no classification information for the packet will be stored in the bearer/flow table 720. Upon determining that no classification information for the packet is currently stored in bearer/flow table 720, CL logic 716 encapsulates (3) the packet/GTP-U header as shown in FIG. 7B with an IP address header 806 (e.g., an overlay header) including the IP address for CLASS/CLASS-A 710 and an NSH label 804 indicating that no classification currently exists for the subscriber's traffic and sends (4) the packet including the headers/labels to CLASS/CLASS-A 710 for classification and/or load balancing. In at least one embodiment, a 'no classification' indication can be provided by setting the SPI for the NSH label 804 to all zeros or all ones.

Upon receiving the packet including the headers/labels, the CLASS/CLASS-A 710 determines (5) a classification for the subscriber's traffic to a particular service chain or set of service chains (e.g., a service chain for MPC application and/or a service chain for and, in some embodiments, load balances the traffic to select a particular service path/path(s) for each service chain(s). Each service path(s) for each service chain(s) can be identified with an SPI. It is assumed for the present operational example that the traffic is classified to be operated on using services configured for both MPC application 712 and Gi-LAN application 714. In various embodiments, the classification can be based on policy and/or charging information provided to CLASS/CLASS-A via PCRF 728, OCS 730 and/or OfCS 732, which can include policy and/or charging information gathered using push and/or pull operations (6) via these elements.

Figure 7C:
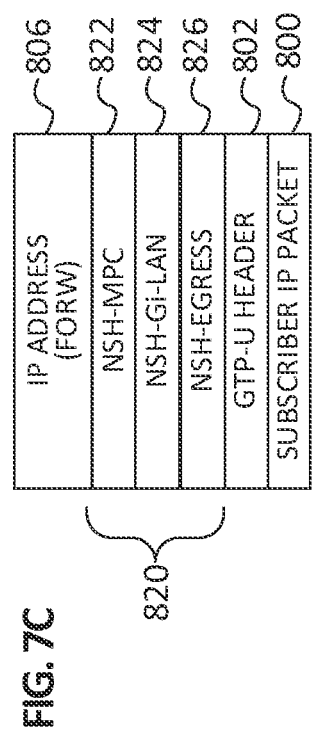

Following the classification and optional load balancing, the CLASS/CLASS-A 710 constructs (7) a label stack 820, as shown in FIG. 7C, including an NSH-MPC label 822, an NSH-Gi-LAN label 824 and an NSH-egress label 826, replaces the IP address header 806 with the IP address for FORW 708 and encapsulates the packet 800 and GTP-U header 802 with the label stack 820 and IP address. The order of the NSH labels for the label stack is determined according to the direction of the traffic (e.g., NSH-MPC label 822 is the outermost label for forward path traffic; for reverse path, an NSH-Gi-LAN label would be the outermost label for reverse path packets). It should be understood that each label 822, 824, 826 is an IETF SFC NSH structure that includes one or more headers. In various embodiments, the information carried in the headers within each NSH can be manipulated to carry SPI, service index number, load balancing information, policy information, combinations thereof or the like as described herein. Additional example details regarding an example NSH label configuration are discussed in further detail below with reference to FIG. 8. In some embodiments, an NSH-egress label may not be provided for a label stack. When no NSH-egress label is provided for a stack, a default egress route can be used to forward traffic.

In various embodiments, say for example, that a given deployment is configured as a TDF (e.g., for a Gi-LAN only infrastructure), then an NSH-MPC label would not be present in a label stack for such traffic traversing the infrastructure. Multiple classification operations can be avoided, in at least one embodiment, by CLASS/CLASS-A 710 making a single classification and optional load balancing decision for traffic. In one embodiment, CLASS/CLASS-A 710 can include an indication in a label stack for a return packet sent back to FORW 708 that indicates 'no further classification needed' for traffic for the subscriber's bearer and/or flow. However, as discussed herein, a classification and/or load balancing decision can be modified for traffic if congestion occurs for a given service path, a failure occurs, policy and/or charging state changes for a subscriber, etc. Thus, in some embodiments, CLASS/CLASS-A 710 can communicate to FORW 708 that another classification and/or load balancing decision is needed for a bearer and/or flow by sending another return packet to FORW 708 including the indication, which can cache the classification and/or load balancing decisions to apply to subsequent packets. Accordingly, in various embodiments, CLASS/CLASS-A 710 can cache a subscriber's packet header and/or the 5-/6- or 7-tuple flow mask information that identifies a bearer and/or flow for a subscriber in order to construct another packet and label stack to send to FORW 708.

Figure 7D:
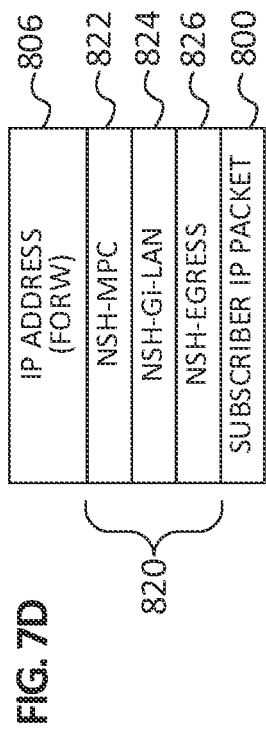

The CLASS/CLASS-A 710 sends (8) the packet 800 including the label stack 820 and GTP-U header 802 back to FORW 708. The CL logic 716 stores (9) the label stack 820 in bearer/flow table 720 and forwards (10) the packet 800 including the label stack 820 and GTP-U header 802 to the ST logic 718. The ST logic 718 can steer (11) the packet 800 through service(s) for the service path selected for MPC application 712. Service(s) within the selected service chain path for MPC application 712 can operate (12) on the packet 800. At a minimum (e.g., for a fast-path service chain), operations performed for the MPC application 712 can include stripping the GTP-U header 802 from the packet 800, as shown in FIG. 7D; however, other operations can be performed using the packet, as discussed for various embodiments described herein. At each hop through the service chain, the ST logic 718 can decrement the service number index within the NSH-MPC label 822. In various embodiments, other metadata, parameters, etc. can be consumed from the NSH-MPC label 822 by service(s) on the service chain for the MPC application 712.

Figure 7E:
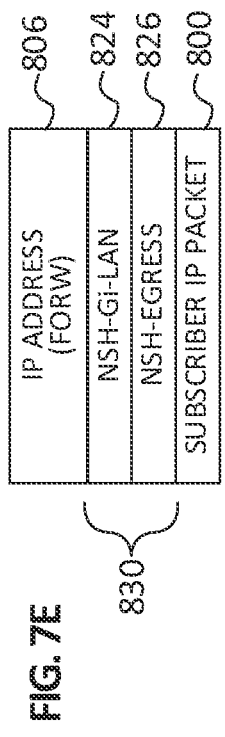

When the service index number is equal to zero for the NSH-MPC label 822, the ST logic 718 can pop (13) the label stack 820 to remove the outermost NSH-MPC label 822; thereby creating, as shown in FIG. 7E, a new label stack 830 for the packet that includes the NSH-Gi-LAN label 824 as the new outermost label and the NSH-egress label 826 still as the innermost label. The ST logic 718 can steer (14) the packet 850 through service(s) for the service path selected for Gi-LAN application 714. Service(s) within the selected service chain path for Gi-LAN application 714 can operate (15) on the packet 850 and, hop through the service chain, the ST logic 718 can decrement the service number index within the NSH-Gi-LAN label 824.

Figure 7F:
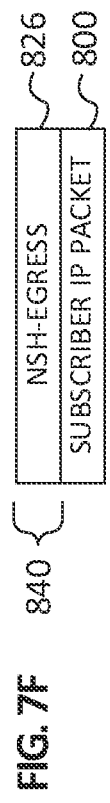

When the service index number is equal to zero for the NSH-Gi-LAN label, the ST logic 718 again can pop (16) the label stack 830 to remove the outermost NSH-Gi-LAN label 824; thereby creating, as shown in FIG. 7F, a new label stack 840 for the packet that includes the NSH-egress label 826 still as the new outermost label. The ST logic 718 can remove the NSH-egress label 826 and parse (17) information carried in the NSH-egress label 826 to identify the egress attachment circuit (e.g., the second attachment circuit 706 in the present operational example). Once identified, the ST logic 718 can forward (18) the packet to the second attachment circuit 706.

Figure 7G:
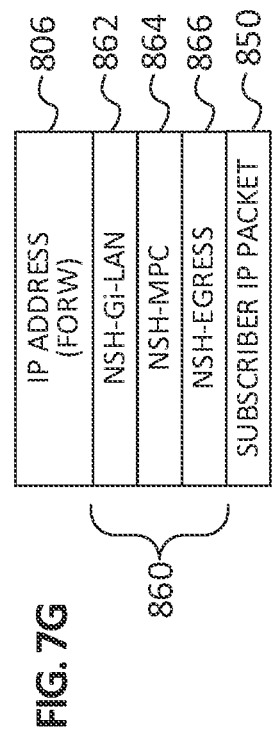

Reverse path traffic for the bearer and/or flow can be sent (19) back to FORW 708 from second attachment circuit 706. Certain processing for reverse path traffic is not identified in FIG. 6 for purposes of brevity. For a first reverse path packet 850, as shown in FIG. 7G, the reverse path traffic for the subscriber can be classified, as discussed above, in a similar manner to identify a reverse service chain path(s) for the traffic, which may or may not be an identical reverse order of services as were applied for the forward path traffic, and can construct, as shown in FIG. 7G, a new label stack 860 for the packet 850, which can include an NSH-Gi-LAN label 862, an NSH-MPC label 864 and an NSH-egress label 866. An IP address header 806 can also be encapsulated to the packet 850 the packet for directing traffic to an appropriate node for each hop through an identified reverse path service chain.

Figure 7H:
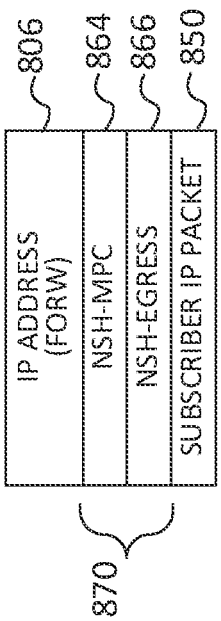
Figure 7I:
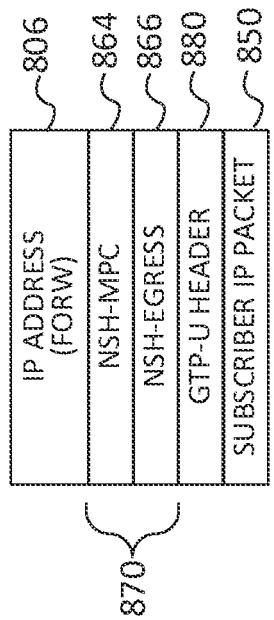
Figure 7J:
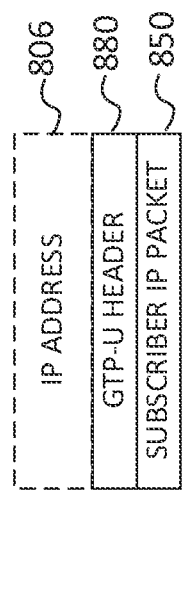

Once classified and optionally load balanced, the ST logic 718 can steer (20) the packet 850 through the service chain path identified for Gi-LAN application 714 via the NSH-Gi-LAN label 862. Once the service index number is equal to zero for the NSH-Gi-LAN label 862, the ST logic 718 can pop the stack 860 to remove the label; thereby creating a new label stack 870, as shown in FIG. 7H, in which, NSH-MPC label 864 is the new outermost label with NSH-egress label 866 remaining the innermost label. The ST logic 718 can then steer (21) the packet 850 through the service chain identified for MPC application 712. At a minimum, (e.g., for a fast-path service chain) the packet 850 can be encapsulated via MPC application 712 with a GTP-U header 880, as shown in FIG. 7I, which can be inserted after the innermost NSH label, NSH-egress label 866 for label stack 870. Once the service index number is equal to zero for the NSH-MPC label 864, label stack 870 can be popped to remove the outermost NSH-MPC label 864, the NSH-egress label 866 can be removed and the egress attachment circuit (e.g., first attachment circuit 704) for the reverse path packet 850 can be identified. The ST logic 718 can send (22) the reverse path packet 850 including the GTP-U header 880, as shown in FIG. 7J, to the first attachment circuit 704 and the packet can be sent back to UE 702. In some embodiments, header 806 can be included with the GTP-U header 880.

Referring to FIG. 8A-8C, FIGS. 8A-8C are simplified schematic diagrams illustrating example details that can be associated with an example NSH label 900 that can be configured for a label stack in accordance with various embodiments. NSH label 900 can include a 4-byte base header 910, a 4-byte service path header 920 and one or more context header(s) 930, which can be of variable length. In various embodiments, context header(s) 930 can include metadata and/or variable length encoded information that may be consumed or otherwise used by one or more service(s) of a given service chain. A further discussion of example details that can, in various embodiments, be associated with base header 910 and service path header 920 is provided below in reference to FIGS. 8B and 8C.

In various embodiments, base header 910 can provide information about the NSH label 900 and the payload protocol. Referring to FIG. 8B, FIG. 8B is a simplified schematic diagram illustrating example details that can be associated with base header 910 in accordance with various embodiments. The base header 910 can include a version (VER) field 911, an operations and management bit (O) 912, a critical metadata bit (C) 913, reserved bits (R) 914, a length field (LENGTH) 915, a metadata type field (MD TYPE) 916 and a next protocol field (NEXT PROTOCOL) 917. In one embodiment, VER field 911, O bit 912, C bit 913, R bits 914, LENGTH field 915 and MD TYPE field 915 can be configured according to IETF standards. In one embodiment, NEXT PROTOCOL field 917 can carry information identifying the original protocol of the original packet to which the label is added. However, in another embodiment, the NEXT PROTOCOL field 917 can be used to identify a type for the label.

In accordance with at least one embodiment, two types can be defined for a 'next' header for use with IETF SFC NSH label stacking: NSH-join and NSH-no-join. A type 'NSH-no-join' can be used to indicate that a next NSH label (e.g., a subsequent header in a label stack) is an IETF SFC NSH that is to be processed sequentially. When the service index reaches 0 for a current header, the outer IETF SFC NSH label is decapsulated (e.g., popped) and the (next) inner IETF SFC NSH label is processed normally.

A type 'NSH-join' can be used to indicate that a label is an IETF SFC NSH label that is to be joined with a current header for return traffic. An NSH-join type header can be cached in a forwarder for use with reverse path traffic for a given bearer and/or flow. In various embodiments, utilizing an NSH-join type indication can allow for a mode of operation that provides optimizations that can be realized when loosely coupled sets of applications (e.g., application A and B, where application A and B are managed under separate operating domains) are provided in mobile service infrastructure 50. In accordance with one embodiment, two values can be reserved for use in the NEXT PROTOCOL field 917; a first value that can indicate a NSH-no-join type and a second value that can indicate a NSH-join type. In various embodiments, the values can be chosen by a network operator or service provider and do not need to be consecutive values.

Consider an operational example involving forward path traffic being steered through application A and application B as shown in FIG. 2. When an NSH label, say the NSH label 602 for application A as shown in FIG. 5, is identified as a type NSH-join, as a forward path packet progress through a first service chain (e.g., a service chain associated with application A) and reaches the end of the service chain, the outermost header is not decapsulated by the last forwarder FORW-ST for the service chain associated with application A and the packet is forwarded to a first forwarder FORW-ST for a second service chain (e.g., service chain associated with application B). Recall, the service index number can be decreased following operations on the packet at each service in the service chain associated with application A.

Upon receiving the packet, the first forwarder can analyze the contents of the outermost NSH label to determine how to handle the label/packet. In particular, the first FORW-ST can determine check whether the service index within the label is non-zero (e.g., indicating that the header was manipulated via a previous service chain/application) and, if the service index is zero, can check the NSH-join/NSH-no-join indicator for the outermost header to determine whether it is to be cached for use with reverse path traffic. If the service index is zero and the NSH-join indication is included in the NEXT PROTOCOL field, then the first forwarder for application B can decapsulate (e.g., pop) the label and can cache the label, along with IP addressing information for the last FORW-ST associated with application A, for use with reverse path traffic. The first FORW-ST for the service chain associated with application B forward path traffic can then steer the packet into a first forward path service according to service path information included in the NSH label for application B (e.g., label 604 as shown in FIG. 5).

For reverse path traffic, when the service index for a packet being forwarded (in a reverse order) through the service chain associated application B reaches the FORW-ST (which is now the last FORW-ST for reverse path traffic but which was the first FORW-ST for forward path traffic), the service index will be at zero for the outermost NSH label (e.g., a label associated with a reverse path chain for application B). When the service index reaches zero, the associated FORW-ST will replace the outermost label with the cached label and forward the packet to the appropriate FORW-ST for application A using the associated cached IP address information for the FORW-ST and the label can be processed normally by application A. Thus, the join/no-join feature can be used in embodiments in which applications are loosely coupled.

As discussed, the NEXT PROTOCOL field 917 for all but the innermost IETF SFC NSH label (e.g., the egress label) can use one of two reserved values to indicate that another IETF SFC NSH is encapsulated until the stack ends. Thus, in at least one embodiment, the NSH-join/NSH-no-join indicators can be overloaded with the NSH type for the NEXT PROTOCOL field, which can help to save header space in comparison to using another bit of the base header 910 to provide such an indication. Different NSH labels can be encapsulated for each stage of service chain processing, allowing for different metadata and/or optimizations. In contrast to label stacking in MPLS, asymmetric concatenation is possible with NSH label stacking. One reserved value (e.g., NSH-join) can indicate that an NSH label corresponds to an IETF SFC NSH and is intended to signify a symmetric composed chain (implying the reverse path should go through both chains) and thus the header is to be encapsulated onto reverse path traffic. The other reserved value (e.g., NSH-no-join) can indicate an NSH label corresponds to IETF SFC NSH, but the labels in a given stack do not implement a composed chain (implying an asymmetric reverse path that does not go through the same services/service chains as forward path traffic) and thus labels can be processed independently.

Referring to FIG. 8C, FIG. 8C is a simplified schematic diagram illustrating example details that can be associated with service path header 920 in accordance with various embodiments. In various embodiments, service path header 920 can include a 24-bit SERVICE PATH ID (SPI) field 921 an 8-bit SERVICE INDEX field 922.

In some embodiments, to allow easier load balancing and scalability, sets of logical service chains and associated services can be organized in slices. A slice can be defined as a group of services chained with one or more logical service chains within the group and multiple slices (e.g., multiple instantiations) of the same slice type may exist in the system. To grow capacity, new slices (e.g., instantiations) of a certain slice type can be added, while to shrink capacity, existing and active slices can be discarded as a unit (i.e., including services and logical service chains). Once a flow has been classified to a particular logical service chain, the load balancing task assigns a slice (e.g., service path) hosting that logical service chain.

Slices can be used to form the basis for 'subscriber stickiness'. Subscriber stickiness consists of guaranteeing that all of a subscriber's bearers and/or flows (or a group of subscribers) are assigned to a same slice and, thus, same service instances. For example, all traffic of a subscriber must traverse a same DPI service function to enforce bandwidth caps. This implies that the load-balancing decision for a given bearer and/or flow is determined by earlier flows already active in the system. In a slice-based system it is enough to guarantee that all traffic for a given subscriber is assigned to a same slice.

In some embodiments, the SERVICE PATH ID field 921 can be divided into separate components: a first component can be the logical service chain determined by policy and/or charging information for a given subscriber, and a second component can be the load-balancing decision towards a slice that implements the determined logical service chain. Without loss of generality, this approach can, in various embodiments, be implemented using bit fields (e.g., by dividing the SERVICE PATH ID field provided in a service path header), adding a separate load-balancing field, or other methods. By recording the two decisions separately, classifiers can be enabled to perform any of the decisions.

Optionally, in some embodiments, to make load-balancing decisions can require a classifier to have input from a corresponding management application or system (e.g., identifying configurations of different possible paths and/or slices and/or current load data), which can be used to make load-based decisions. For example, in some embodiments, the SERVICE PATH ID field 921 can be composed of a Policy ID (PID) to identify a logical service chain classification and a Load-Balancing ID (LBID) to identify a slice to implement the logical service chain from (2).

Thus, in various embodiments, each of one or more classifier(s) (e.g., CLASS and/or CLASS-A) deployed for a mobile service infrastructure can perform (1) policy and/or charging assignment and/or (2) load-balancing decisions for mobile packet core services and/or Gi-LAN services. In some embodiments, a classifier may need visibility into the other applications to make such decisions. For example, in a given deployment, a single classifier may be used to perform mobile packet core classification and/or load balancing as well as Gi-LAN classification and/or load balancing Gi-LAN. Allowing a classifier to separately perform (1) policy and/or charging assignment and (2) load-balancing for any component of a given mobile service infrastructure can be enabled by separating the SERVICE PATH ID for an NSH label into a Policy ID (PID) and Load-Balancing ID (LBID) and can enable many different deployment models including a PCEF and Gi-LAN deployment model, the standalone TDF model and a TSSF model.

In some embodiments, a classifier and/or a service function (e.g., for embodiments in which the NSH-join/NSH-no-join indication is used) can modify an encapsulated IETF SFC NSH label for other components. For example, in a given mobile service infrastructure deployment, a PGW service function in a mobile packet core application can insert an IETF SFC NSH label for steering a forward path packet through Gi-LAN services. Classifiers can therefore optionally communicate efficiently within the service functions in the data-plane, in some embodiments. In still other embodiments, a single classifier can perform both policy and/or charging assignment and load-balancing decisions for multiple application components, reducing pressure on the policy infrastructure.

Thus, IETF SFC NSH labels can, in various embodiments, be stacked to compose chains and/or applications or they can be stacked to support asymmetric paths where, for example, forward flow traffic traverses one or more service functions different from reverse flow traffic for a given bearer and/or flow. Further, composing service chains using slices/service paths eliminates the need to enumerate exponentially all the paths through applications.

Figure 9A:
FIGS. 9A-9E are simplified schematic diagrams illustrating other example details that can be associated with another example label stacking use case in accordance with one potential embodiment.

Referring to FIGS. 9A-9E, FIGS. 9A-9E are simplified schematic diagrams illustrating other example details that can be associated with another example label stacking use case in accordance with one potential embodiment. In particular, FIGS. 9A-9E illustrate example details associated with an example label stacking use case in which label stacking for forward path traffic can be manipulated by a service function associated with an MPC application (e.g., fast-path or slow-path service chain processing). FIG. 9A illustrates a subscriber IP packet 1000 encapsulated with a GTP-U header 1002, which can be received at a given FORW-CL. In one embodiment, assuming the packet 1000 is a first packet received for a bearer and/or flow for a given subscriber at a given FORW-CL for forward path traffic, then the bearer and/or flow can be classified via a given CLASS/CLASS-A and a label stack can be constructed. It is assumed for the present example embodiment that the CLASS/CLASS-A is configured to only perform classification and optional load balancing for the MPC application for forward path traffic and for the Gi-LAN application for reverse path traffic.

Figure 9B:
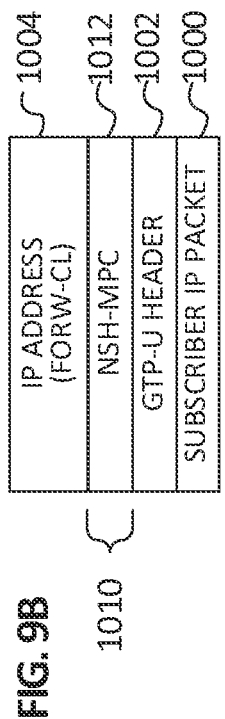

FIG. 9B illustrates subscriber IP packet 1000 returned from CLASS/CLASS-A being encapsulated with an overlay (e.g., IP) header 1004 containing the IP address for the FORW-CL, GTP-U header 1002 and a label stack 1010 including an NSH-MPC label 1012. The encapsulated packet can be forwarded by the FORW-CL to a given FORW-ST for a service chain slice (e.g., instantiation) selected for the bearer and/or flow (e.g., the first FORW-ST for the MPC application). The IP address within header 1004 can be replaced with the IP address for the given FORW-ST upon forwarding the packet 1000 from the FORW-CL. The FORW-ST (and/or other FORW-STs, if applicable) can then steer the packet through the service function(s) for mobile packet core service chain slice.

Figure 9C:
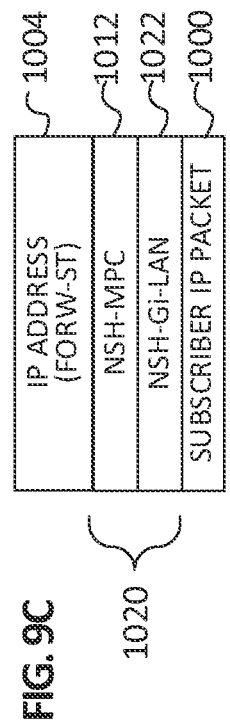

At a minimum (e.g., for slow-path processing), operations for the service(s) configured for the MPC application can include stripping and decoding the GTP-U header 1002. In at least one embodiment, by decoding the GTP-U header (e.g., the flow mask), a last FORW-ST for the service chain slice can classify and/or load balance the packet for processing by a service chain/service chain slice configured for a Gi-LAN application. Upon determining the service chain classification and/or slice, the last FORW-ST can re-encapsulate the packet 1000, as shown in FIG. 9C with a label stack 1020 including the NSH-MPC label 1012 and a NSH-Gi-LAN label 1022. The last FORW-ST for the mobile packet core service chain slice forward path traffic can also set an NSH-join value in the NSH-MPC label 1012 to indicate that the first FORW-ST for the Gi-LAN application should cache the NSH-MPC label 1012 for use with reverse path traffic. Header 1004 can be manipulated to include the IP address for the first FORW-ST for the Gi-LAN application.

Figure 9D:
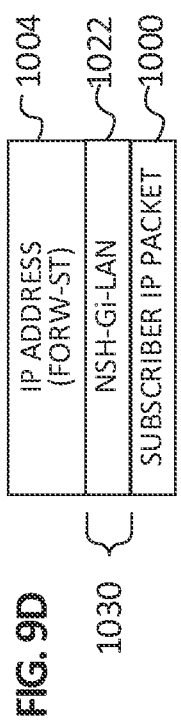
Figure 9E:
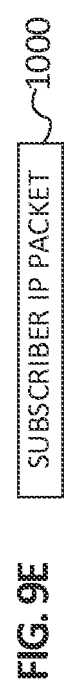

Upon receiving the packet, first FORW-ST for the Gi-LAN application pops the outermost NSH-MPC label 1012 and stores the label based on the NSH-join indication being set; thereby constructing, as shown in FIG. 9D a new label stack 1030 for the packet 1000 including only the NSH-Gi-LAN label 1022. The first FORW-ST (and/or other FORW-STs, if applicable) can then steer the packet through the service chain slice for the Gi-LAN application. At the end of the service chain slice, a last FORW-ST for the Gi-LAN application can remove the label stack 1030 as shown in FIG. 9E and the packet 1000 can be routed to an egress attachment circuit (e.g., a default egress attachment circuit since no NSH-egress label was present for the stack).

Referring to FIGS. 10A-10E, FIGS. 10A-10E are simplified schematic diagrams illustrating yet other example details that can be associated with yet another example label stacking use case in accordance with one potential embodiment. In particular, FIGS. 10A-10E illustrate example details that can be associated with reverse path operations for reverse path traffic following the forward path operations discussed for FIGS. 9A-9E in which no network address translation (NAT) is needed for the reverse path traffic.

Figure 10A:
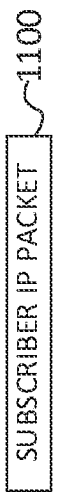
FIGS. 10A-10E are simplified schematic diagrams illustrating yet other example details that can be associated with yet another example label stacking use case in accordance with one potential embodiment.

FIG. 10A illustrates a reverse path subscriber IP packet 1100, which can be received at the FORW-CL. Assuming the packet 1100 is a first packet received for a bearer and/or flow for a given subscriber the FORW-CL for reverse path traffic, then the bearer and/or flow can be classified via the CLASS/CLASS-A and a label stack can be constructed.

Figure 10B:
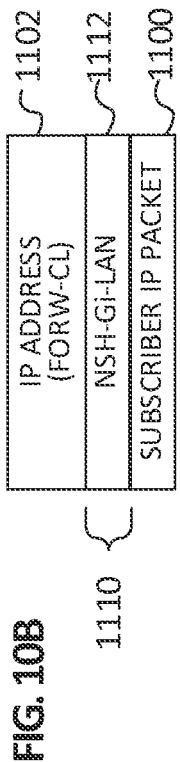

FIG. 10B illustrates subscriber IP packet 1100 returned from CLASS/CLASS-A being encapsulated with an overlay header 1102 containing the IP address for the FORW-CL and a label stack 1110 including an NSH-Gi-LAN label 1112. The encapsulated packet can be forwarded by the FORW-CL to a given FORW-ST for a service chain slice (e.g., instantiation) selected for the bearer and/or flow (e.g., a first FORW-ST for the Gi-LAN application). The IP address within the overlay header 1102 can be replaced with the IP address for the given FORW-ST upon forwarding the packet from the FORW-CL. The FORW-ST (and/or other FORW-STs, if applicable) can then steer the packet through the service function(s) for Gi-LAN service chain slice.

Figure 10C:
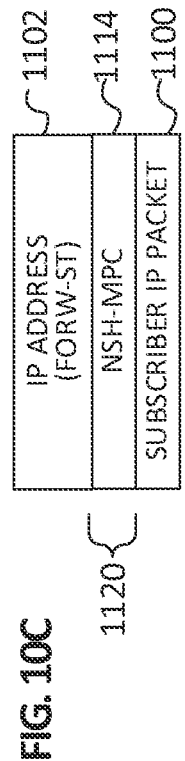

A last FORW-ST for the Gi-LAN service chain slice can classify and/or load balance the packet for processing by a service chain/service chain slice configured for the MPC application. Upon determining the service chain classification and/or slice, the last FORW-ST can pop the NSH-Gi-LAN label 1112 from the stack and can re-encapsulate the packet 1100, as shown in FIG. 10C with a label stack 1120 including an NSH-MPC label 1114 based on the NSH-MPC cached label (e.g., NSH-MPC 1012 from FIG. 9C). The last FORW-ST can determine the appropriate NSH-MPC cached label to apply to the packet by matching the 5-tuple of the packet to information contained in a 5-tuple cached for forward path traffic for the subscriber. The NSH-MPC label 1112 can identify services for the MPC service chain slice in a reverse order from the order indicated in the NSH-MPC label 1012; the service index number can also be reset for the NSH-MPC label 1112 based on the number of services in the MPC service chain slice that are to operate on the packet 1100.

Figure 10D:
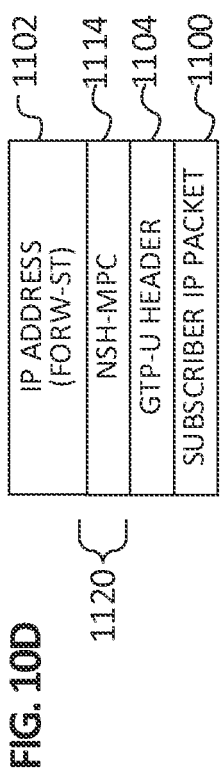
Figure 10E:
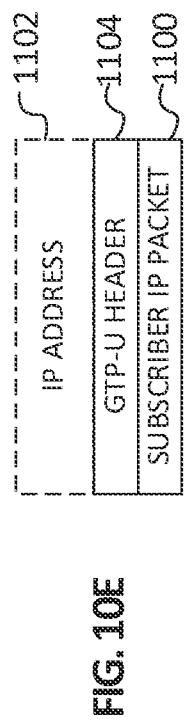

At a minimum (e.g., for slow-path processing), operations for the service(s) configured for the MPC application can include encapsulating, as shown in FIG. 10D, the packet 1100 with a GTP-U header 1104 and header 1102. At a last service function for the MPC service chain slice, the label last label in label stack 1120 (e.g., NSH-MPC 1114) can be popped from the stack) and the packet 1100 can be re-encapsulated with the GTP-U header 1104, as shown in FIG. 10E, and routed to an egress attachment circuit for the reverse path traffic (e.g., service provider network 30). In some embodiments, header 1102 can be included with the GTP-U header 1104.

In at least one embodiment, reverse path traffic may be forwarded to the last forward path traffic FORW-ST for a Gi-LAN application (which would be the first FORW-ST for reverse path traffic) without first classifying the traffic. In such an embodiment, the first reverse path FORW-ST can be configured to classify the traffic to a particular bearer and/or flow and apply the appropriate label stack for reverse path processing.

Referring to FIG. 11, FIG. 11 is a simplified flow diagram illustrating example details that can be associated with example operations 1200 to facilitate hosting mobile packet core and value-added services using an SDN and service chains in accordance with one potential embodiment.

In one embodiment, the operations can begin at 1202 in which traffic associated with at least one of a mobile packet core network and/or a Gi-LAN is received. The traffic can be received, in at least one embodiment, via an ingress interface configured for FORW-CL 310, as shown in FIGS. 1A-1B. In at least one other embodiment, the traffic can be received via an ingress interface at a centralized FORW configured with both CL logic and ST logic (e.g., FORW 708 configured with CL logic 716 and ST logic 718, as shown in FIG. 6).

At 1204, the operations can include determining a classification of the traffic to a service chain. In various embodiments, the service chain can be configured with service functions associated with at least one of mobile packet core services and Gi-LAN services. In various embodiments, the traffic can be classified according to a 5-/6- or 7-tuple flow mask included for a packet associated with traffic. In some embodiments, the traffic can be load balanced to a particular service path associated with the service chain to which the traffic is classified. The service path can include instantiations of the service functions included in the service chain to which the traffic is classified and can be identified using a Service Path ID (SPI). In various embodiments, the traffic can classified and/or load balanced for a bearer and/or flow. In some embodiments, classification and load balancing decisions can be performed differently for mobile packet core service functions, for Gi-LAN service functions and/or for egress processing.

At 1206, the operations can include routing the traffic through the service chain. In various embodiments, the routing can be performed using a centralized FORW-ST (e.g., ST logic 718 as shown in FIG. 6) or can be performed using distributed FORW-STs (e.g., FORW-ST(1)-FORW-ST (3) as shown in FIGS. 1A-1B. In some embodiments, data descriptive of a network graph may be stored for a plurality of service functions associated with a plurality of service chains and/or set(s) of service chains. In some embodiments, the network graph can include a plurality of service chains each identified by a service path identifier. In some embodiments, a particular service function may be part of multiple ones of the plurality of service chains and/or set(s) of service chains. In some embodiments, a particular service function may change an outgoing label (e.g., IETF SFC NSH label) to switch traffic to another service chain, using the techniques as discussed herein. In other words, a particular service function as part of a first service chain, may, in certain embodiments, change an outgoing label on packets of a particular traffic flow to route the packets of the particular traffic flow from the first service chain to a second service chain. This may useful to reroute some traffic, or to bypass a specific downstream service function.

At 1208, the operations can include routing the traffic to a network using one of a plurality of egress interfaces, wherein each egress interface is associated with at least one of the mobile packet core services and the Gi-LAN services and the operations can end. As discussed for various embodiments described herein, one or more labels can be stacked on packets to form a service chain label stack for packets routed within mobile service infrastructure 50. In some embodiments, a label can be an NSH label identifying one or more service functions (physical and/or virtual) on a service chain (or service path, if applicable), which can be associated with one or both of service functions for an MPC application and/or a Gi-LAN application. In still some embodiments a label can be an NSH label identifying an egress attachment circuit (e.g., a network external to the mobile service infrastructure 50) to which traffic is to be routed following operations performed for a given service chain or set(s) of service chains. A label stack can be used to multiplex between mobile packet core service functions and/or applications, Gi-LAN service functions and/or application and/or between egress interface(s). Thus, as shown in FIG. 12, mobile packet core and value-added services can be hosted using an SDN and service chains in accordance with one potential embodiment of communication system 10 including mobile service infrastructure 50.

Figure 12:
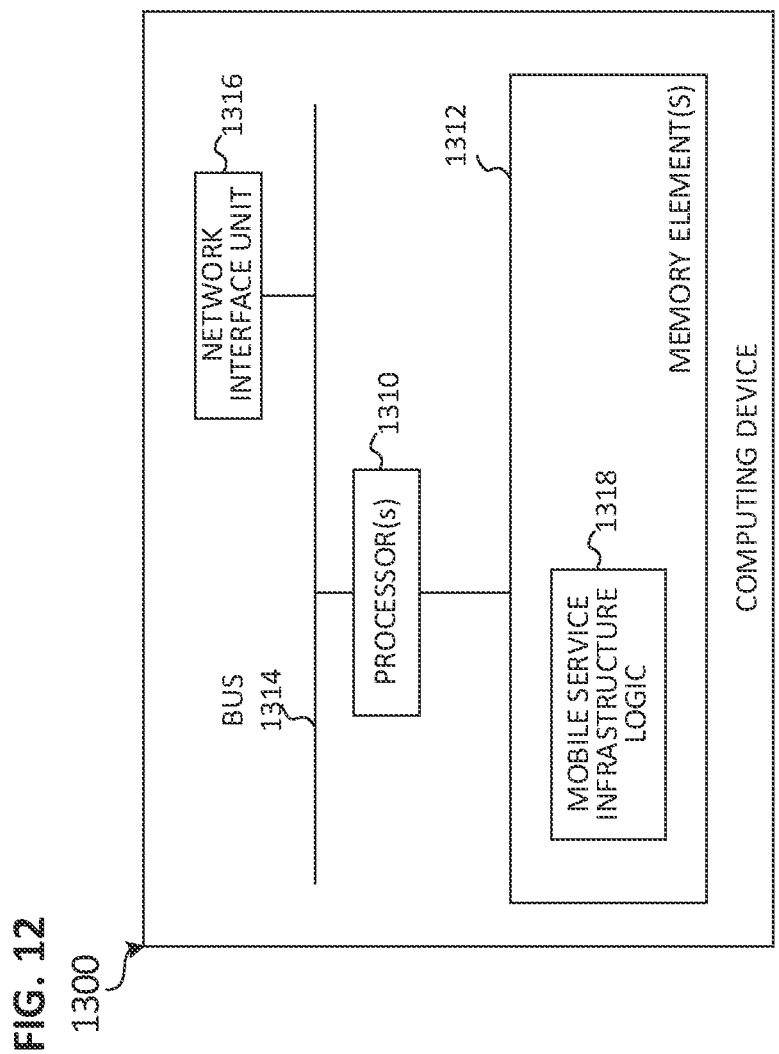
FIG. 12 is a simplified block diagram illustrating example details that can be associated with one potential embodiment of the present disclosure.

Referring to FIG. 12, FIG. 12 is a simplified block diagram illustrating example details that can be associated with one potential embodiment of the present disclosure. In particular, FIG. 12 includes a computing device 1300 configured to perform operations associated with hosting mobile packet core and value-added services using an SDN and service chains for a mobile service infrastructure in accordance with one potential embodiment. Computing device 1300 includes at least one processor(s) 1310, at least one memory element(s) 1312, at least one bus 1314 and at least one network interface unit 1316 (e.g., one or more network interface cards). In at least one embodiment, at least one memory element(s) 1312 can be encoded with mobile service infrastructure logic 1318 to perform various operations discussed for various embodiments described herein. In various embodiments, mobile service infrastructure logic 1318 can be configured with logic to host one or more service function(s), service function chain(s), set(s) of service function chains and/or can be configured with classifier logic, forwarding logic, combinations and variations thereof as described herein to perform various operations discussed for various embodiments described herein.

In at least one embodiment, computing device 1300 can be a compute node (e.g., data center compute node 550, as discussed in the embodiment of FIG. 4). In various embodiments, computing device 1300 may be configured as part of a cloud computing and/or data-center environment.

In at least one embodiment, at least one processor 1310 is at least one hardware processor configured to execute various tasks, operations and/or functions for computing device 1300 as described herein and at least one memory element 1312 is configured to store data associated with computing device 1300. In various embodiments, bus 1314 can be configured as an interface that enables one or more elements of the computing device (e.g., network interface unit 1316, processor(s) 1310, memory element(s) 1312 and/or mobile service infrastructure logic 1318) to communicate in order to exchange information and/or data. In various embodiments, network interface unit 1316 enables communication to receive mobile packet core network traffic and/or Gi-LAN services traffic for processing and routing the traffic to a corresponding egress attachment circuit, as described herein.

In regards to the internal structure associated with communication system 10 and mobile service infrastructure 50, any computing device, network element, node and/or system (e.g., management system(s) 722) can be configured to include a respective at least one processor, a respective at least one memory element in accordance with various embodiments. In addition, in some embodiments, storage can be configured for any such device, element node and/or system. Hence, appropriate software, hardware and/or algorithms are being provisioned for communications system 10 and mobile service infrastructure 50 in order to facilitate operations as described for various embodiments discussed herein to facilitate hosting mobile packet core and value-added services using a SDN and service chains. Note that in certain examples, certain databases or storage (e.g., for storing information associated with operations discussed herein) can be consolidated with memory elements (or vice versa), or the storage can overlap/exist in any other suitable manner.

In one example implementation, computing devices, network elements, nodes and/or systems can be network elements, which are meant to encompass network appliances, servers, routers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIGS. 1A-1B, 6, etc.). Alternatively, one or more of the computing devices, network elements, nodes and/or systems discussed herein can include software (or reciprocating software) that can coordinate in order to achieve operations associated with hosting mobile packet core and value-added services using a SDN and service chains, as outlined herein. In still other embodiments, one or more of the computing devices, network elements, nodes and/or systems may include any suitable algorithms, hardware, software, components, modules, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, the computing devices, network elements, nodes and/or systems discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to the computing devices, network elements, nodes and/or systems discussed herein could be provided in any database, register, control list, cache, and/or storage structure: all of which can be referenced at any suitable timeframe. Any such storage options may be included within the broad term 'memory element' as used herein. Similarly, any of the potential processing elements, modules, controllers, logic and/or machines described herein should be construed as being encompassed within the broad term 'processor'. Each of the computing devices, network elements, nodes and/or systems discussed herein can also include suitable interfaces for receiving, transmitting, and/or otherwise communicating data or information in a network environment.

Note that in certain example implementations, operations as outlined herein may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element [as shown in FIG. 12] can store data used for the operations described herein. This includes memory elements being able to store software, logic, code, and/or processor instructions that are executed to carry out operations described herein. A processor (e.g., a hardware processor) can execute any type of instructions associated with data to achieve the operations detailed herein. In one example, a processor [as shown in FIG. 12] could transform an element or an article (e.g., data, information) from one state or thing to another state or thing. In another example, operations outlined herein may be implemented with logic, which can include fixed logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of the computing devices, elements, nodes and/or systems discussed for various embodiments described herein can couple to one another through simple interfaces (as illustrated) or through any other suitable connection (wired or wireless), which provides a viable pathway for network communications. Additionally, any one or more of these computing devices, elements, nodes and/or systems may be combined or removed from a given deployment based on particular configuration needs. Communications in a network environment are referred to herein as 'messages', 'messaging' and/or 'signaling', which may be inclusive of communications using packets.

In various embodiments, communication system 10 including mobile service infrastructure 50 can represent a series of points or nodes of interconnected communication paths (wired or wireless) for receiving and transmitting packets of information that propagate through communication system 10. In various embodiments, communication system 10 can be associated with and/or provided by a single network operator or service provider and/or multiple network operators or service providers. In various embodiments, communication system 10 can include and/or overlap with, in whole or in part, one or more packet data networks, such as, for example, internet and/or enterprise network(s) 40. Communication system 10 may offer communicative interfaces between various computing devices, elements, nodes and/or systems and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 10 may implement user datagram protocol/Internet Protocol (UDP/IP) connections and/or transmission control protocol/IP (TCP/IP) communication language protocol in particular embodiments of the present disclosure. However, communication system 10 can alternatively implement any other suitable communication protocol, interface and/or standard, proprietary and/or non-proprietary, for transmitting and receiving messages. Other protocols, interfaces and/or communication standards that can be used in communication system 10 can include 3GPP Diameter-based protocols, Remote Authentication Dial-In User Service (RADIUS) protocols, AAA signaling, terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol, Simple Object Access Protocol (SOAP), SOAP over Hypertext Transfer Protocol (HTTP), Representational State Transfer (REST), combinations thereof or the like.

Accordingly, presented herein are a system and methods for realizing mobile packet core services and/or Gi-LAN services through a service graph of independent service modules (e.g., service functions). In some embodiments, these modules can jointly implement a full mobile service core, yet, by careful assignment of service modules to service paths, and by careful dynamic assignment of flows and/or bearer to such service paths by a 3GPP classifying and load-balancing agent, mobile packet core services and/or Gi-LAN services can be selectively used and/or disused, which can enables (very) fine grain optimization of mobile packet core and/or Gi-LAN services.

Traditional service core instances can be integrated simply by hosting such instances on similar service graphs. Also, hybrid models are supported. In addition, by joining the mobile packet core service graph with a Gi-LAN side service graph, a comprehensive mobile service core infrastructure is produced.

In conventional solutions, virtual or physical mobile networks, which can include mobile packet cores (e.g., 3GPP, 3GPP2, or other), generally referred to as Packet Cores (PCs) are typically implemented as monolithic servers. All traffic flows through a given mobile follows roughly the same path through the mobile network. By contrast, as presented in the various embodiments and examples provided herein, mobile network services and/or Gi-LAN services can be modularized using modules to carry out specific functions on packet flows. This is augmented with a flow-routing infrastructure that identifies packet bearers and/or flows and sends them through only those modules that are relevant to a particular bearer and/or flow. A service chaining solution, as discussed for various embodiments and examples provided herein, can be applied to mobile core networks, thereby greatly increasing their capacity. Traffic can be routed through modules that are optimized to handle particular traffic and traffic only visit modules that need to be visited. A bearer and/or flow not subject to, for example, legal intercept, will not visit a legal-intercept service function. By supporting a few key mobile network data-plane functions in a service chain, many low-value mobile bearer operations do not need to be routed through a full-blown mobile network, thus enabling service providers to use their mobile networks for high-value bearer operations. Off-loaded bearers are mostly only patched through between ingress and egress by way of the service-chaining layer.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 10 may be applicable to other exchanges or routing protocols, interfaces and/or communications standards, proprietary and/or non-proprietary. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims

What is claimed is:

1. A method comprising:
   receiving traffic at a classifier associated with a first forwarding function in a first service layer of a mobile service infrastructure, the traffic comprising one or more packets;
   determining at the classifier a classification of the traffic;
   forwarding the traffic to the first forwarding function as an encapsulated packet,
      wherein the encapsulated packet further comprises: a network service header (NSH) encoding metadata and service path information, a service path identifier associated with a service chain, a service index, and one or more service function labels,
      wherein the service chain comprises at least one service function associated with one or more mobile packet core network services and at least one service function associated with one or more data-plane services within the first service layer;
   forwarding the traffic through the service chain associated with the service path identifier; and
   forwarding the traffic to a network using one of a plurality of egress interfaces, wherein at least two of the plurality of egress interfaces are associated with different service functions in the service chain, and wherein each egress interface of the plurality of egress interfaces is associated with at least one of the one or more mobile packet core network services and the one or more data-plane services.

2. The method of claim 1, further comprising:
   configuring at least one mobile packet core network fast-path comprising one or more service functions to perform only decapsulation and encapsulation operations on traffic; and
   configuring at least one mobile packet core network slow-path comprising one or more service functions to perform decapsulation and encapsulation operations on traffic and to perform one or more operations associated with one or more mobile packet core network services on traffic.

3. The method of claim 2, wherein one or more service functions configured for a particular mobile packet core network fast-path perform at least one of: General Packet Radio Service (GPRS) Tunneling Protocol (GTP) decapsulation and encapsulation operations on the one or more packets.

4. The method of claim 1, wherein determining the classification is performed based on at least one of:
- policy information associated with a Policy and Charging Rules Function (PCRF);
- charging information associated with an Online Charging System (OCS); and
- charging information associated with an Offline Charging System (OfCS).

5. The method of claim 1, wherein forwarding the traffic includes multiplexing the traffic between the one or more mobile packet core network services and the one or more data-plane services and forwarding the traffic to the network from an egress interface associated with the one or more data-plane services.

6. The method of claim 1, wherein forwarding the traffic includes multiplexing the traffic between the one or more mobile packet core network services and the one or more data-plane services and forwarding the traffic to the network from an egress interface associated with the one or more mobile packet core network services.

7. The method of claim 1, wherein the traffic is associated with at least one of a bearer and a flow for a particular subscriber and wherein the classification is determined for at least one of the bearer and the flow for the particular subscriber.

8. The method of claim 1, further comprising storing data representing a network graph for a plurality of service chains, wherein each service chain is identified by a service path identifier.

9. The method of claim 8, wherein a particular service function is included within a plurality of the plurality of service chains.

10. The method of claim 1, wherein the determining further comprises:
- determining whether a classification for the traffic is stored at the first forwarding function;
- and if not, forwarding the traffic to a classification agent;
- determining the classification for the traffic at the classification agent; and
- returning the packet and the classification for the traffic to the first forwarding function.

11. The method of claim 10, further comprising:
- constructing a service path identifier based on the classification; and
- encapsulating the packet with the service path identifier to return to the first forwarding function.

12. The method of claim 10, further comprising:
- constructing NSH and a list of labels at the classification agent; and
- encapsulating the packet with the NSH and list of labels to return to the first forwarding function.

13. The method of claim 12, further comprising:
- storing classification information for the traffic at the first forwarding function; and
- forwarding subsequent traffic with the same classification without re-classifying the traffic.

14. The method of claim 10, further comprising:
- load balancing the traffic to one of a plurality of service chain paths, wherein each service chain path comprises one or more service functions to perform operations associated with the service chain to which the traffic is classified.

15. The method of claim 1, wherein the method further comprises:
- receiving the traffic at a second classifier associated with a second forwarding function in a second service layer of a mobile service infrastructure;
- determining, at the second classifier a classification of the traffic to a service chain within the second service layer;
- forwarding the traffic to the second forwarding function as an encapsulated packet, wherein the encapsulated packet further comprises:
  - a network service header (NSH) encoding metadata and second service path information, a second service path identifier, a second service index, and one or more service function labels;
  - wherein the second service chain comprises at least one service function associated with the one or more mobile packet core network services and at least one service function associated with the one or more data-plane services within the second service layer; and
- forwarding the traffic through the second service chain associated with the second service path identifier; and
- forwarding the traffic to a network using one of a plurality of egress interfaces, wherein at least two of the plurality of egress interfaces are associated with different service functions in the service chain, and wherein each egress interface of the plurality of egress interfaces is associated with at least one of the one or more mobile packet core network services and the one or more data-plane services.

16. The method of claim 15, wherein the second service layer is in series with the first service layer.

17. A system comprising:
- a mobile service infrastructure comprising:
  - a decomposed mobile packet core,
    - wherein the decomposed mobile packet core comprises a series of mobile core and data-plane functions,
    - wherein the mobile core and the data-plane functions are grouped into at least one service layer,
    - wherein a service layer includes: one or more mobile packet core network services and one or more data-plane services and at least one service chain comprising one or more service functions; and
  - at least one classifying and forwarding function in the mobile service infrastructure configured to:
    - receive, at a classifier associated with a first forwarding function in the service layer of a mobile service infrastructure traffic comprising one or more packets;
    - determine a classification of the traffic to a service chain;
    - forward the traffic to the service chain as one or more encapsulated packets, wherein an encapsulated packet further comprises:
    - a network service header (NSH) encoding metadata and service path information, a service path identifier, a service index, and one or more service function labels;
    - wherein each application comprises one or more service functions, wherein the service chain comprises at least one service function associated with the one or more mobile packet core network services and at least one service function associated with the one or more data-plane services within the service layer; and
    - forward the traffic through the service chain associated with the service path identifier; and
    - forward the traffic to an external network using one of a plurality of egress interfaces, wherein at least two of the plurality of egress interfaces are associated with different service functions in the service chain, and wherein each egress interface of the plurality of egress interfaces is associated with at least one of the one or more mobile packet core network services and the one or more data-plane services.

18. The system of claim 17, further comprising:
at least one mobile packet core network fast-path comprising one or more service functions configured to perform only decapsulation and encapsulation operations on traffic; and
at least one mobile packet core network slow-path comprising one or more service functions configured to perform decapsulation and encapsulation operations on traffic and to perform one or more operations associated with one or more mobile packet core network services on traffic.

19. The system of claim 17, further comprising a controller, wherein the controller stores data representing a network graph for a plurality of service functions, and wherein the network graph comprises a plurality of service chains each identified by a service path identifier.

20. The system of claim 17, wherein the traffic is associated with at least one of a bearer and a flow for a particular subscriber, and wherein the classification is determined for at least one of the bearer and the flow for the particular subscriber.

21. The system of claim 17, wherein the mobile core and data-plane functions are grouped into at least a first service layer and a second service layer.

22. The system of claim 21, wherein the first service layer is in series with the second service layer.

* * * * *